(12) United States Patent
Abdelaal et al.

(10) Patent No.: US 12,269,775 B1
(45) Date of Patent: Apr. 8, 2025

(54) COMPOSITION FOR ENHANCING THE THICKENING TIME OF HEMATITE-BASED FLY ASH GEOPOLYMERS

(71) Applicant: KING FAHD UNIVERSITY OF PETROLEUM AND MINERALS, Dhahran (SA)

(72) Inventors: Ahmed Elsayed Ahmed Ibrahim Abdelaal, Dhahran (SA); Salaheldin Mahmoud Ahmed Elkatatny, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/403,810

(22) Filed: Jan. 4, 2024

(51) Int. Cl.
| | |
|---|---|
| *C04B 28/02* | (2006.01) |
| *C04B 14/30* | (2006.01) |
| *C04B 22/06* | (2006.01) |
| *C04B 24/18* | (2006.01) |
| *C04B 24/20* | (2006.01) |
| *C04B 24/42* | (2006.01) |
| *C04B 40/00* | (2006.01) |
| *C09K 8/48* | (2006.01) |

(Continued)

(52) U.S. Cl.
CPC .......... *C04B 28/021* (2013.01); *C04B 14/308* (2013.01); *C04B 22/062* (2013.01); *C04B 24/18* (2013.01); *C04B 24/20* (2013.01); *C04B 24/42* (2013.01); *C04B 40/0082* (2013.01); *C09K 8/48* (2013.01); *E21B 33/138* (2013.01); *C04B 2103/20* (2013.01); *C04B 2103/32* (2013.01); *C04B 2103/50* (2013.01); *C04B 2201/50* (2013.01)

(58) Field of Classification Search
None
See application file for complete search history.

(56) References Cited

U.S. PATENT DOCUMENTS 4,188,231 A * 2/1980 Valore .................. C04B 28/02
 106/725
7,438,755 B2 10/2008 Wagh et al.

(Continued)

OTHER PUBLICATIONS

Saeed Salehi, et al., "Development of Geopolymer-based Cement Slurries with Enhanced Thickening Time, Compressive and Shear Bond Strength and Durability", IADC/SPE Drilling Conference and Exhibition, Paper No. IADC/SPE-178793-MS, Mar. 1, 2016, pp. 1-15.

(Continued)

*Primary Examiner* — Andrew Sue-Ako
(74) *Attorney, Agent, or Firm* — Oblon, McClelland, Maier & Neustadt, L.L.P.

(57) ABSTRACT

A hematite-based fly ash composition includes a curable component including a fly ash binder material (FFA) and a hematite weighting agent present in an amount of 20 to 80% by weight of the fly ash binder material (BWOB). The composition further includes superplasticizers (SPs) in an amount of 5 to 10% BWOB; retarders in an amount of 5 to 10% BWOB; a defoamer in an amount of 0.01 to 0.02% BWOB; and an aqueous alkaline solution in an amount of 50 to 60% BWOB. The hematite-based fly ash composition has a thickening time of from 80 to 580 minutes at 195° F. and a plastic viscosity of 150 to 350 cP.

12 Claims, 13 Drawing Sheets

(51) Int. Cl.
*E21B 33/138* (2006.01)
*C04B 103/20* (2006.01)
*C04B 103/32* (2006.01)
*C04B 103/50* (2006.01)

(56) References Cited

U.S. PATENT DOCUMENTS

| | | | |
|---|---|---|---|
| 7,794,537 B2 | 9/2010 | Véronique et al. | |
| 11,535,557 B2 | 12/2022 | Alkhalaf et al. | |
| 2007/0284104 A1* | 12/2007 | Beckman | C04B 28/02 106/804 |
| 2009/0105099 A1* | 4/2009 | Warrender | C04B 28/04 507/269 |
| 2011/0067605 A1* | 3/2011 | Constantz | C04B 28/02 106/739 |
| 2012/0318174 A1* | 12/2012 | Ravi | C04B 28/02 106/710 |
| 2013/0284070 A1* | 10/2013 | Dubey | C04B 11/28 106/695 |
| 2014/0209390 A1* | 7/2014 | Jamison | E21B 7/00 175/213 |
| 2015/0090451 A1* | 4/2015 | Bourlon | C04B 28/02 521/149 |
| 2019/0092688 A1* | 3/2019 | Ziehl | C04B 28/04 |
| 2019/0218445 A1* | 7/2019 | Pernites | C09K 8/46 |
| 2019/0225544 A1* | 7/2019 | Kriven | C04B 28/26 |
| 2021/0292231 A1* | 9/2021 | Alanqari | C04B 14/041 |
| 2023/0151260 A1* | 5/2023 | Alanqari | C09K 8/467 166/293 |

OTHER PUBLICATIONS

Chunyu Wang, et al., "Benefits of delayed addition of rutin on the thickening time and compressive strength of oil well cement", Construction and Building Materials, vol. 322, Mar. 7, 2022, 3 pages (Abstract only).

Pantharee Kongsat, et al., "Effect of Morphologically Controlled Hematite Nanoparticles on the Properties of Fly Ash Blended Cement", Nanomaterials, vol. 11, Issue 4, Apr. 14, 2021, pp. 1-19.

* cited by examiner

COMPOSITION FOR ENHANCING THE THICKENING TIME OF HEMATITE-BASED FLY ASH GEOPOLYMERS

STATEMENT REGARDING PRIOR DISCLOSURE BY THE INVENTORS

Aspects of this technology are described in A. Abdelaal, and S. Elkatatny "Synergy of retarders and superplasticizers for thickening time enhancement of hematite based fly ash geopolymers" published in Geoenergy Science and Engineering, Volume 224, 211641, which is incorporated herein by reference in its entirety.

STATEMENT OF ACKNOWLEDGEMENT

This research was supported by the College of Petroleum Engineering and Geosciences at King Fahd University of Petroleum & Minerals, Dhahran, Saudi Arabia.

BACKGROUND

Technical Field

The present disclosure is directed to a composition comprising a fly ash and a hematite weighting agent, particularly to a composition for enhancing the thickening time of hematite-based fly ash geopolymers at high temperatures.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Geopolymers represent an advancing technology poised to replace ordinary Portland cement (OPC) within the oil and gas industry. Geopolymers can be synthesized using aluminosilicate materials, including various waste and rock-based materials. However, heavy-weight geopolymers suffer from low thickening times, particularly under elevated temperatures. It's worth noting that thickening time is affected by downhole pressures and temperatures, with the temperatures having the most pronounced impact. As downhole temperatures increase, the cement slurry sets more rapidly. Thickening time is defined as a period of time in which a cement slurry remains pumpable under wellbore conditions. It is an important parameter in cementing operations to mitigate the risks of premature or delayed setting.

Retarders serve as additives employed to extend the thickening time of cement slurries. Some retarders are essentially blends of different components that enhance the performance over a wider temperature range. Temperature is one of the principal factors in retarding process within cement slurries. In the hours following a cement operation, a retarder gradually gets consumed, facilitating the setting of the cement. Each retarder exhibits an optimal temperature range for its effectiveness. Therefore, it is important to select the retarder based on the anticipated bottomhole circulating temperature (BHCT) and bottom-hole pressure conditions it will encounter (Liu, G., 2021. Applied Well Cementing Engineering, Applied Well Cementing Engineering. Elsevier).

Adsorption, precipitation, nucleation, and complexation represent the four primary mechanisms of retardation in cement. The key categories of retarders encompass lignosulfonates, hydroxycarboxylic acids, saccharide compounds, cellulose derivatives, organophosphates, as well as select inorganic compounds like zinc oxide, lead oxide, certain inorganic acids, and their corresponding salts. Among these, the sodium and calcium salts of lignosulfonic acids stand out as the most commonly employed retarders in well cementing applications. Lignosulfonates, originating from wood pulp, are polymer compounds that often remain unprocessed and feature varying levels of saccharide components (E. B. Nelson and Guillot, 2006).

To enhance the rheological properties of suspensions, as commonly required in concrete applications, superplasticizers (SPs), often referred to as high-range water reducers, are utilized in those situations where well-dispersed particle suspensions are required. The incorporation of superplasticizers allows for a reduction in water-to-cement ratio without adversely affecting the mixture's workability. SPs have been increasingly used in the construction industry (Xu, G., Beaudoin, J. J., Jolicoeur, C., Page, M., 2000. The effect of a polynaphthalene sulfonate superplasticizer on the contribution of the interfacial transition zone to the electrical resistivity of mortars containing silica and limestone fine aggregate. Cem Concr Res 30, 683-691). Superplasticizers can generally be classified into four categories: sulfonated synthetic polymers, carboxylate synthetic polymers, and synthetic polymers with mixed functionality cementitious substances (Nkinamubanzi, P. C., Aïtcin, P. C., 2004. Cement and Superplasticizer Combinations: Compatibility and Robustness. Cement, Concrete, and Aggregates 26, 1-8). Other products based on polycarboxylic ethers are also available, but sulfonated naphthalene condensate or sulfonated melamine formaldehyde have traditionally been used to make SPs. Cross-linked melamine- or naphthalene-sulfonates, referred to as polymelamine sulfonate (PMS) and polynaphthalene sulfonate (PNS) are prepared through the crosslinking of sulfonated monomers using formaldehyde or through sulfonation of the corresponding crosslinked polymer (Mollah, M. Y. A., Adams, W. J., Schennach, R., Cocke, D. L., 2015. A review of cement-superplasticizer interactions and their models).

The flocculated cement particles are dispersed by naphthalene and melamine sulfonate-based superplasticizers through an electrostatic repulsion mechanism. When molecules of the active ingredients are adsorbed onto cement particles, they acquire a negative charge, inducing repulsive forces between them. Organic polymers such as lignin, naphthalene, and melamine sulfonate superplasticizers envelop the cement particles with long carbon chain molecules, imparting a robust negative charge that fosters mutual repulsion. Unlike sulfonate-based superplasticizers, polycarboxylate ether superplasticizers (PCE) or simply polycarboxylate (PC) provide cement dispersion by steric stabilization. Polysulfonate-based and polycarboxylate-based superplasticizers have good compatibility with high-alkali and sulfate cement, while polysulfone-based superplasticizers demonstrate limited compatibility with low-alkali cement (Lu, B., Weng, Y., Li, M., Qian, Y., Leong, K. F., Tan, M. J., Qian, S., 2019. A systematical review of 3D printable cementitious materials. Constr Build Mater 207, 477-490). The utilization of weighting agents in geopolymers is relatively new within the domain of oil and gas well cementing.

Although compositions containing various retarders and/or superplasticizers have been developed in the past to enhance the thickening times, there still remains a need to develop compositions having enhanced thickening time.

US20230151260A1 discloses a cement composition that contains a cement precursor, silica sand, silica flour, a weighting agent, a cement retarder, a defoamer, a gelling agent. The weighting agent is present in an amount of about 16% by weight of cement (BWOC).

U.S. Pat. No. 7,794,537B2 discloses a geopolymeric composition having a viscosity less than or equal to 300 cP. The geopolymeric composition contains an aluminosilicate source, a metal silicate, an alkali activator and a carrier fluid. Additionally, the geopolymeric composition may further contain a weighting agent, such as hematite.

U.S. Pat. No. 11,535,557B2 discloses a retarder mixture for oil and gas well cementing. The retarder mixture contains a lignosulfonate compound, and one or more hydrolyzed carbohydrate compounds. Additionally, the retarder mixture may further include a hematite weighting agent.

U.S. Pat. No. 7,438,755B2 discloses a sealant for an oil well containing MgO, $KH_2PO_4$, class C fly ash, class F fly ash, and boric acid. Additionally, the sealant may further include a hematite weighting agent.

In view of the foregoing, one objective of the present disclosure is to provide a hematite-based fly ash composition. A second objective of the present disclosure is to provide a method of producing a cured specimen from the hematite-based fly ash composition. A third objective of the present disclosure is to provide a method of cementing oil and gas wells.

SUMMARY

In an exemplary embodiment, a hematite-based fly ash composition, is described. The composition includes a curable component comprising a fly ash binder material (FFA) and a hematite weighting agent present in an amount of 20 to 80% by weight of the fly ash binder material (BWOB). The composition also includes one or more superplasticizers (SPs) in an amount of 5 to 10% BWOB. Additionally, the composition includes one or more retarders in an amount of 5 to 10% BWOB; a defoamer in an amount of 0.01 to 0.02% BWOB; and an aqueous alkaline solution in an amount of 50 to 60% BWOB. In some embodiments, the hematite-based fly ash composition has a thickening time of from 80 to 580 minutes at 195 degree Fahrenheit (° F.), and a plastic viscosity of 150 to 350 centipoise (cP).

In some embodiments, the thickening time of the curable component comprising 75% BWOB of the hematite weighting agent is at least 81.4% lower than the thickening time of the curable component comprising 25% BWOB of the hematite weighting agent.

In some embodiments, the FFA is in the form of spherical fly ash particles having an average particle size $D_{50}$ of about 20 to 25 μm.

In some embodiments, the FFA is at least one selected from the group consisting of class C fly ash and class F fly ash.

In some embodiments, the FFA contains 59 to 63 wt. % $SiO_2$, 27 to 31 wt. % $Al_2O_3$, 2.5 to 6.5 wt. % $Fe_2O_3$, 1 to 4 wt. % $K_2O$, 1 to 3 wt. % $TiO_2$, 0.05 to 0.5 wt. % $P_2O_5$, 0.05 to 0.5 wt. % $SO_3$, 0.05 to 0.5 wt. % MgO, each wt. % based on a total weight of the FFA, as determined by X-ray fluorescence (XRF) analysis.

In some embodiments, the hematite weighting agent is in the form of irregular shaped hematite particles having an average particle size $D_{50}$ of about 20 to 25 μm.

In some embodiments, the FFA has a specific gravity of 2 to 2.2, and wherein the hematite weighting agent has a specific gravity of 5 to 5.1.

In some embodiments, one or more superplasticizers include one or more sulfonated polymers, one or more carboxylate polymers, and one or more polycarboxylic ethers.

In some embodiments, one or more retarders include one or more lignosulfonates, one or more hydroxycarboxylic acids, one or more saccharides, one or more cellulose derivatives, and one or more organophosphonates.

In some embodiments, the defoamer includes at least one of a silicone defoamer, a mineral oil defoamer, an ester defoamer, and an ether defoamer.

In some embodiments, the aqueous alkaline solution includes an alkali metal hydroxide and an alkali silicate.

In some embodiments, the aqueous alkaline solution includes an alkali metal hydroxide selected from the group consisting of potassium hydroxide, sodium hydroxide, lithium hydroxide, and calcium hydroxide.

In some embodiments, the composition includes a curable component comprising class F fly ash and a hematite weighting agent present in an amount of 25 to 75% by weight of the class F fly ash (BWOB); a polynaphthalene sulfonate superplasticizer in an amount of 5 to 10% BWOB; a lignosulfonate-based retarder in an amount of 5 to 10% BWOB; a dimethyl silicone polymer in an amount of 0.01 to 0.02% BWOB; and a sodium hydroxide solution in an amount of 50 to 60% BWOB. In some embodiments, sodium hydroxide is present in the sodium hydroxide solution at a concentration of 1 to 8 molars (M).

In an exemplary embodiment, a method of producing a cured specimen is described. The method includes mixing and casting the hematite-based fly ash composition in a mold to form a molded composition, and curing the molded composition for 12 to 48 hours, thereby forming the cured specimen. In some embodiments, the curing is conducted at a temperature of 150 to 200° F.

In some embodiments, the curing is performed under atmospheric condition at a temperature of 195° F., the method having a thickening time of 30 to 650 minutes as determined by a consistometer.

In some embodiment, the cured specimen consists of the hematite-based fly ash composition, and has a Poisson's ratio of 0.2 to 0.27.

In some embodiments, the cured specimen consists of the hematite-based fly ash composition, and has a Young's modulus of 2 to 5 GPa.

In some embodiments, the cured specimen consists of the hematite-based fly ash composition, and has a uniaxial compressive strength (UCS) of 400 to 1200 psi by following the scratch test method.

In some embodiments, a method of cementing oil and gas wells is described. The method includes mixing a curable component, one or more superplasticizers, one or more retarders, a defoamer, and an aqueous alkaline solution to form a hematite-based fly ash composition. In some embodiments, the curable component includes a fly ash binder material (FFA) and a hematite weighting agent present in an amount of 75% by weight of the fly ash binder material (BWOB). The method further includes placing the hematite-based fly ash composition into the oil and gas wells and allowing the hematite-based fly ash composition to set therein.

In some embodiments, the method of cementing the oil and gas wells is conducted in at least one of an oil well and a gas well having a temperature of 150 to 200° F.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
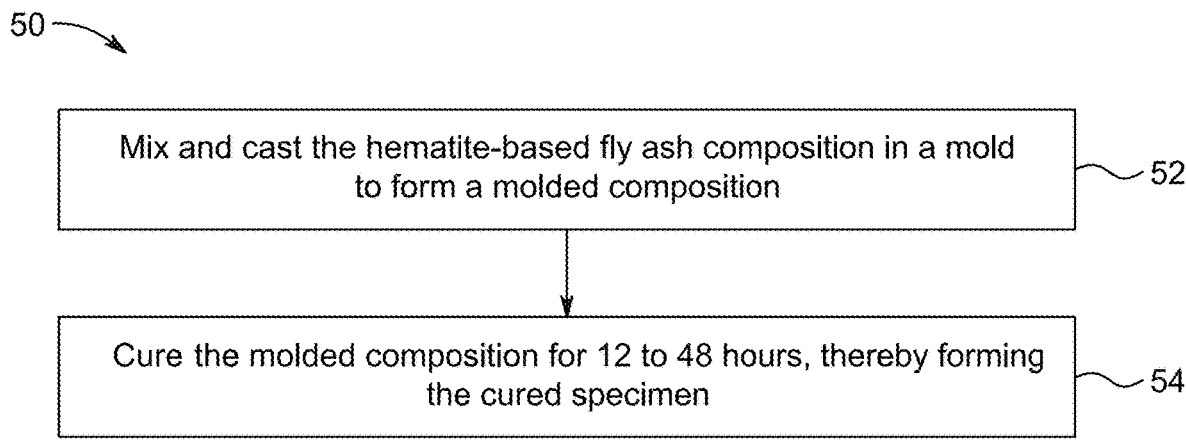
FIG. 1A is a flowchart depicting a method of producing a cured specimen, according to certain embodiments.

In the drawings, reference numerals designate identical or corresponding parts throughout the several views. Further, as used herein, the words "a," "an," and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The use of the terms "include," "includes," "including," "have," "has," or "having" should be generally understood as open-ended and non-limiting unless specifically stated otherwise.

The terms "elements" and "components" include a single unit as well as more than a single unit unless specified otherwise.

As used herein, the term "cement" generally refers to a composition or substance with one or more constituents that is capable of binding materials together. The term includes reference to a dry, pre-set composition unless the context clearly dictates otherwise.

The phrase "cementitious material," "cementitious binder material" or "binder" generally refers to materials or mixtures of materials that are "cements" or materials that are capable of forming cement or capable of forming materials with cement-like binding properties. In the present disclosure, cementitious materials set and harden by reacting chemically with water, known as hydration. During hydration, water reacts with the cement particles, causing them to form a paste-like substance that hardens over time, and binds the aggregate particles together.

The terms "plasticizer" and "super-plasticizer" include a compound that is inert towards the binder, and such as serves as a medium such that the binder may be suspended or otherwise dispersed. The "plasticizer" or "super-plasticizer" is usually non-volatile at standard room temperature and pressure.

As used herein, the term "thickening time" generally refers to the duration it takes for a cement slurry or mixture to transition from a fluid, pumpable state to a more viscous, solid-like state. In the present disclosure, the term "thickening time" refers to the duration following the mixing of a geopolymer slurry during which pumping becomes impractical due to the initiation of the setting of the geopolymer. In the present disclosure, the "thickening time" may be measured with a consistometer at controlled temperature and pressure, e.g., at 195° F. and atmospheric conditions. The procedure is specified in API Recommended Practice 10B-2 (2013) "Recommended Practice for Testing Well Cements" Section 9, which is incorporated herein by reference in its entirety.

Aspects of the present disclosure are directed to a composition for enhancing or modifying the thickening time of the hematite-based class F fly ash (FFA) geopolymers at downhole/high temperatures in the presence of a mixture containing a modified lignosulfonate retarder and a poly-naphthalene sulphonate (PNS) superplasticizer.

A hematite-based fly ash composition, also referred to as a composition, is described. The composition includes a curable component. In some embodiments, the curable component includes a fly ash binder material (FFA) and a hematite weighting agent. In some embodiments, the FFA is at least one selected from the group consisting of class C fly ash and class F fly ash. In a preferred embodiment, the FFA is a class F fly ash. In some embodiments, the FFA may be used alone or in combination with other known aluminosilicate source materials. Suitable examples of aluminosilicate source materials include but are not limited to, ground blast furnace slag, calcined clays, partially calcined clays (such as metakaolin), aluminum-containing silica fume, natural aluminosilicate, synthetic aluminosilicate glass powder, zeolite, scoria, allophone, bentonite, and pumice. In some embodiments, a mixture of aluminosilicate sources may be used, with one at least being FFA.

As used herein, the term "X-ray fluorescence," or "XRF" generally refers to a non-destructive analytical technique used for determining the elemental composition of a material. An XRF spectrometer measures the characteristic X-rays emitted by atoms in a sample when they are excited by high-energy X-ray radiation. These emitted X-rays have energies that are specific to each element, allowing for the identification and quantification of elements present in the sample. In the present disclosure, the XRF analysis may be performed on a Bruker M4 Tornado X-ray fluorescence spectrometer equipped with an Rh X-ray tube and two XFlash® silicon drift detectors with an active area of 20 to 100, preferably 30 to 90, preferably 40 to 80, preferably 50 to 70, or even more preferably about 60 square millimeters (mm$^2$) each. Other ranges are also possible. In some embodiments, the X-ray fluorescence spectrometer may be operated at a tube voltage of 30 to 70, preferably 40 to 60, or even more preferably about 50 kilovolts (kV) under a current of 400 to 800, preferably 500 to 700, or even more preferably about 600 microamperes (µA). Other ranges are also possible. In some embodiments, the X-ray fluorescence spectrometer may be equipped with a chamber having a pressure of 5 to 50, preferably 10 to 30, or even more preferably about 20 millibars (mbar). Other ranges are also possible. In some embodiments, the X-ray fluorescence spectrometer may be operated under an acquisition time of 10 to 50, preferably 15 to 40, preferably 20 to 30, or even more preferably about 25 milliseconds per pixel (ms/pixel) with a step size of 10 to 100, preferably 30 to 80, or even more preferably about 50 micrometers (µm). Other ranges are also possible.

In an embodiment, the FFA includes 59 to 63 wt. %, preferably 60-62 wt. %, preferably 61-61.5 wt. %, preferably 62.3 wt. % SiO$_2$; 27 to 31 wt. %, preferably 28-30 wt. %, preferably 29-29.5 wt. %, preferably 29.5 wt. % Al$_2$O$_3$; 2.5 to 6.5 wt. %, preferably 3-6 wt. %, preferably 4-5 wt. %, preferably 4.5 wt. % Fe$_2$O$_3$; 1 to 4 wt. %, preferably 2-3 wt. %, preferably 2.1 wt-29.9 wt. %, preferably 21.5 wt. % K$_2$O; 1 to 3 wt. %, preferably 1.5-2.5 wt. %, preferably 1.8-2.2 wt. %, preferably 1.9 wt. % TiO$_2$; 0.05 to 0.5 wt. %, preferably 0.1-0.4 wt. %, preferably 0.15-0.4 wt. %, preferably 0.2-0.3 wt. %, preferably 0.2 wt. % P$_2$O$_5$; preferably 0.05 to 0.5 wt. %, preferably 0.1 to 0.4 wt. %, preferably 0.1 to 0.3 wt. %, preferably 0.1-0.2 wt. %, preferably 0.1 wt. % SO$_3$; 0.05 to 0.5 wt. %, preferably 0.1 to 0.4 wt. %, preferably 0.1-0.2 wt. %, preferably 0.1 wt. % MgO, each wt. % based on the total weight of the FFA, as determined by X-ray fluorescence (XRF) analysis. Other ranges are also possible. In a specific embodiment, the FFA includes about 61.3 wt. % SiO$_2$; about 29.5 wt. % Al$_2$O$_3$; about 4.3 wt. % Fe$_2$O$_3$; about 2.5 wt. % K$_2$O; about 1.9 wt. % TiO$_2$; about 0.2 wt. % P$_2$O$_5$; about 0.1 wt. % SO$_3$; and about 0.1 wt. % MgO, as determined by XRF, and depicted in FIG. 3. Other ranges are also possible.

The FFA has a specific gravity of 2 to 2.2, preferably 2.02 to 2.18, preferably 2.04 to 2.16, preferably 2.06 to 2.14, preferably 2.08 to 2.12, or even more preferably about 2.1. Other ranges are also possible. The specific gravity was determined using the Le Chatelier flask test conforming to ASTM C188 (Standard Test Method for Density of Hydraulic Cement, ASTM C188, which is incorporated herein by reference in its entirety).

Figure 4A:
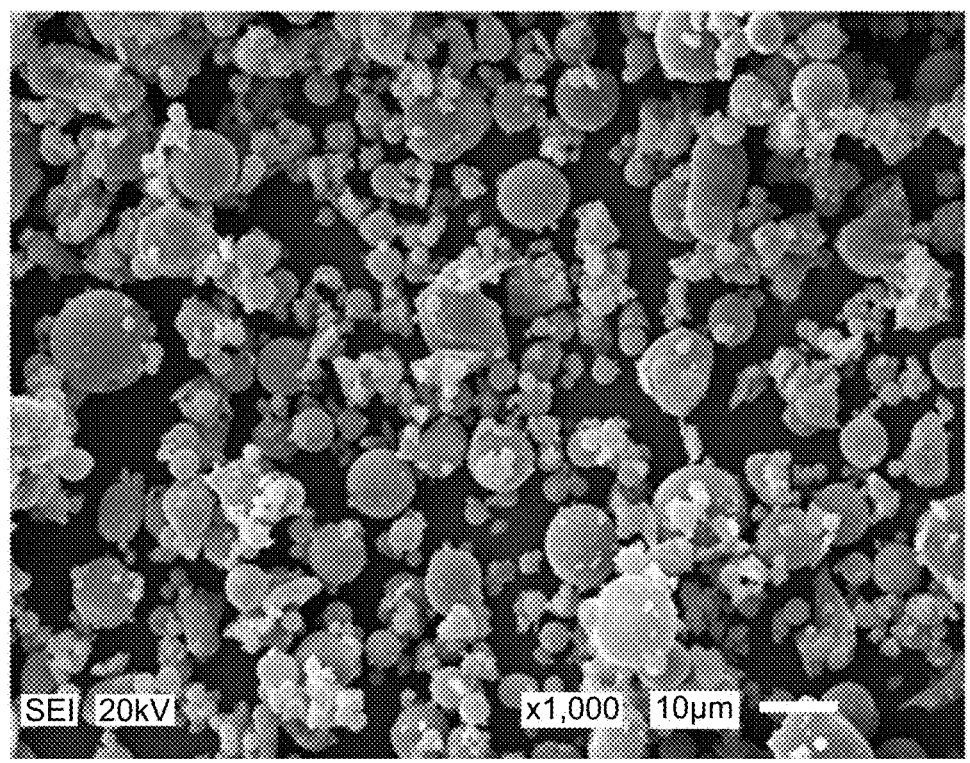
FIG. 4A depicts a scanning electron microscope (SEM) image of the FFA, according to certain embodiments.

In some embodiments, the FFA includes circular shaped and irregularly shaped particles. In some embodiments, a number ratio of the circular shaped particles to the irregularly shaped particles is in a range of 100:1 to 1:100, preferably 50:1 to 1:80, preferably 20:1 to 1:60, preferably 1:1 to 1:40, or even more preferably about 1:20. Other ranges are also possible. In some embodiments, the FFA has an average particle size D$_{50}$ of about 1 to 20 µm, preferably 1 to 10 µm, preferably 2 to 8 µm, preferably 3 to 6 µm, or even more preferably 4 to 5 µm, as depicted in FIG. 4A. Other ranges are also possible.

Figure 4B:
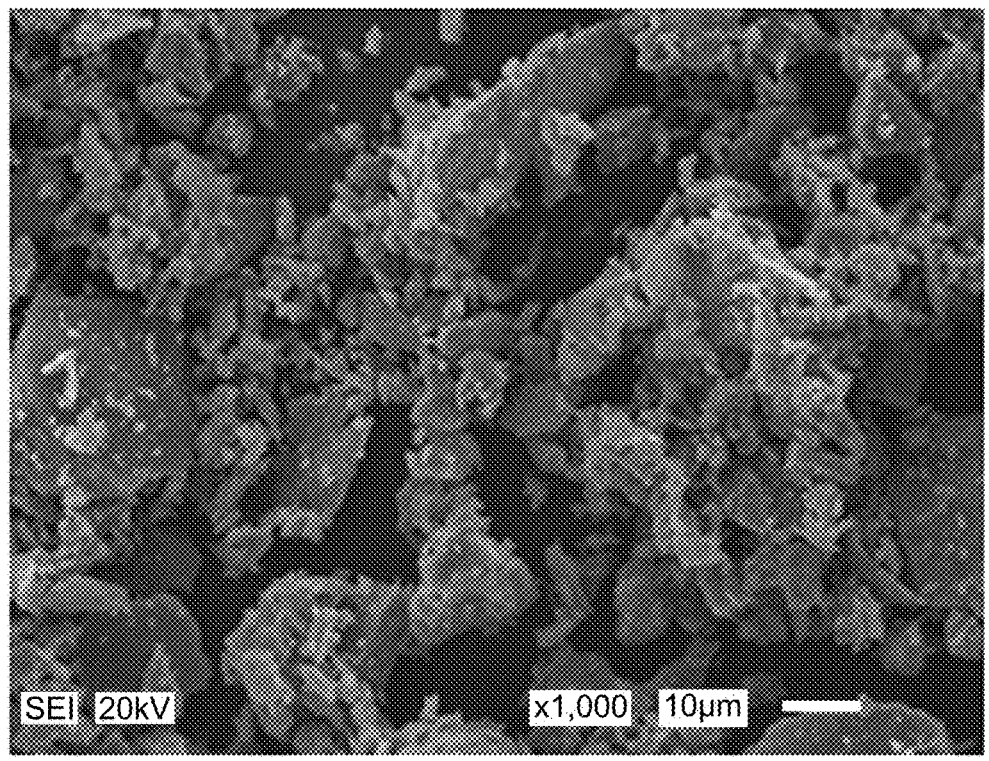
FIG. 4B depicts an SEM image of hematite, according to certain embodiments.

The curable component further includes a hematite weighting agent, present in an amount of 20 to 80% by weight of the fly ash binder material (BWOB). In an embodiment, the hematite weighting agent is present in an amount of 25-75 wt. %, preferably 50-75 wt. %, preferably 75 wt. % of the BWOB. Other ranges are also possible. In some embodiments, the hematite weighting agent has a specific gravity of 5 to 5.1, preferably 5.02 to 5.08, preferably 5.04 to 5.06, or even more preferably about 5.05. Other ranges are also possible. The hematite weighting agent may be present in various forms, including but not limited to kidney ore, a massive, botryoidal (lumpy) or reniform (kidney-shaped) form; specularite, a micaceous (flaky) form; oolitic, a sedimentary form composed of small, rounded grains; red ochre, a red earthy form, and/or combinations thereof. In some embodiments, the hematite weighting agent includes irregularly shaped hematite particles having an average particle size D$_{50}$ of about 5 to 50 µm, preferably 10 to 45 µm, preferably 15 to 40 µm, preferably 20 to 35 µm, or even more preferably 25 to 30 µm, as depicted in FIG. 4B. Other ranges are also possible.

In some embodiments, the hematite weighting agent is at least one iron ore selected from the group consisting of hematite, magnetite, wustite, siderite, ankerite and/or taconite. In some embodiments, the iron ore is hematite containing about 20 to 80 wt. %, preferably 25 to 75 wt. %, preferably 30 to 70 wt. %, preferably 35 to 65 wt. %, preferably 40 to 60 wt. %, or even more preferably about 55 wt. % of Fe, each wt. % based on a total weight of the hematite. Other ranges are also possible.

The curable component may further include a cementitious material. In an embodiment, the cementitious material is at least one selected from the group consisting of ordinary portland cement (OPC), pozzolan cement, gypsum cement, aluminous cement, silica cement, and alkaline cement. In some embodiments, the cementitious material is OPC. The OPC is selected from the group consisting of type I, type II, type III, type, IV, type V, type Ia, IIa, IIIa, or a combination of any two or more types of OPC. In a specific embodiment, the cementitious material is the type I ordinary Portland cement (OPC), and the OPC has a standard specification of ASTM C150 (Standard Specification for Portland Cement, ASTM C150, which is incorporated herein by reference in its entirety).

As used herein, the term "ordinary portland cement" generally refers to the most common type of cement in general use developed from types of hydraulic lime and usually originating from limestone. It is a fine powder produced by heating materials in a kiln to form what is called clinker, grinding the clinker, and adding small amounts of other materials. The Portland cement is made by heating limestone (calcium carbonate) with other materials (such as clay) to >1400° C. This process in a kiln is also known as calcination, whereby a molecule of carbon dioxide is liberated from the calcium carbonate to form calcium oxide, or quicklime, which is then blended with the other materials that have been included in the mix to from calcium silicates and other cementitious compounds. The resulting hard substance, called "clinker" is then ground with a small amount of gypsum into a powder to make ordinary Portland cement (OPC). Several types of Portland cement are available with the most common being called ordinary Portland cement (OPC) which is grey in color.

Suitable examples of cementitious materials include hydraulic cements, Saudi Class G hydraulic cement, non-hydraulic cements, Portland fly ash cement, Portland Pozzolan cement, Portland silica fume cement, masonry cement, EMC cement, stuccos, plastic cement, expansive cement, white blended cement, Pozzolan-lime cement, slag-lime cement, supersulfated cement, calcium aluminate cement, calcium sulfoaluminate cement, geopolymer cement, Rosendale cement, polymer cement mortar, lime mortar, and/or pozzolana mortar. In some embodiments, silica ($SiO_2$) may be present in the cement. In one embodiment, the cement comprises a cement blend of two or more types of cement, for example, a blend comprising Portland cement and non-Portland hydraulic cement. In a further embodiment, the cement is in the dry form. The cement may include $SiO_2$-containing materials including, but not limited to, belite ($2CaO \cdot SiO_2$), alite ($3CaO \cdot SiO_2$), celite ($3CaO \cdot Al_2O_3$), or brownmillerite ($4CaO \cdot Al_2O_3 \cdot Fe_2O_3$).

In an embodiment, the cementitious material is optionally present in the curable component at a concentration of 1 to 20 wt. %, preferably 3 to 15 wt. %, preferably 5 to 10 wt. %, or even more preferably about 7 wt. % based on a total weight of the curable component. Other ranges are also possible.

The composition further includes one or more superplasticizers (SPs) in an amount of 1 to 20%, preferably 5 to 10%, preferably 5-7%, or even more preferably 5% BWOB. Other ranges are also possible. The plasticizer includes at least one included from the group consisting of a lignosulfonate plasticizer, a polycarboxylate ether plasticizer, a melamine plasticizer, and a naphthalene plasticizer. In some embodiments, the plasticizer is a combination of two or more plasticizers selected from the above group. In some specific embodiments, the plasticizer is a combination of one or more plasticizers included from the above group with an organic non-volatile compound.

As used herein, a "plasticizer" is an additive that increases the plasticity or fluidity of slurry. Plasticizers increase the workability of "fresh" hematite-based fly ash composition, allowing it to be placed more easily, with less consolidating effort. A superplasticizer is a plasticizer with fewer deleterious effects. A "superplasticizer" refers a chemical admixture used herein to provide a well-dispersed particle suspension in the wet cement composition. The superplasticizer may be used to prevent particle segregation and to improve the flow characteristics of the wet hematite-based fly ash composition. The superplasticizer may be a polycarboxylate, e.g., a polycarboxylate derivative with polyethylene oxide side chains, a polycarboxylate ether (PCE) superplasticizer, such as the commercially available Glenium 51®. Polycarboxylate ether superplasticizers may allow a significant water reduction at a relatively low dosage, thereby providing good particle dispersion in the wet hematite-based fly ash slurries. Polycarboxylate ether superplasticizers are composed of a methoxy-polyethylene glycol copolymer (side chain) grafted with methacrylic acid copolymer (main chain). Exemplary superplasticizers that may be used in addition to, or in lieu of a polycarboxylate ether superplasticizer include, but are not limited to, alkyl citrates, sulfonated naphthalene, sulfonated alkene, sulfonated melamine, lignosulfonates, calcium lignosulfonate, naphthalene lignosulfonate, polynaphthalenesulfonates, formaldehyde, sulfonated naphthalene formaldehyde condensate, acetone formaldehyde condensate, polymelaminesulfonates, sulfonated melamine formaldehyde condensate, polycarbonate, other polycarboxylates, other polycarboxylate derivatives comprising polyethylene oxide side chains, and the like and mixtures thereof, the SPs may include one or more sulfonated polymers, one or more carboxylate polymers, and one or more polycarboxylic ethers. In some embodiments, the SPs may also include polycarboxylate ethers, polycarbonate, alkyl citrates, sulfonated naphthalene, sulfonated arene, sulfonated melamine, formaldehyde, and the like. In a preferred embodiment, a polynaphthalene sulfonate (PNS) superplasticizer is used in the composition of the present disclosure.

In an embodiment, the hematite-based fly ash composition may further include a surfactant. In a preferred embodiment, the surfactant may be a nonionic surfactant, an anionic surfactant, a cationic surfactant, a viscoelastic surfactant, or a zwitterionic surfactant. The surfactants may include, but are not limited to, ammonium lauryl sulfate, sodium lauryl sulfate (SLS), sodium dodecyl sulfate (SDS), alkyl-ether sulfates sodium laureth sulfate (sodium lauryl ether sulfate (SLES), sodium myreth sulfate, docusate (dioctyl sodium sulfosuccinate), perfluorooctanesulfonate (PFOS), perfluorobutanesulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), CHAPS (3-[(3-cholamidopropyl)dimethylammonio]-1-propanesulfonate), cocamidopropyl hydroxysultaine, ocamidopropyl betaine, phospholipids, and sphingomyelins. In a preferred embodiment, the hematite-based fly ash composition has a weight percentage of the surfactant ranging from 0.1-3.0% BWOB, preferably 0.2-2.5%, preferably 0.5-2.0%, preferably 1.0-1.8%, preferably 1.2-1.6%, or about 1.5% BWOB. Other ranges are also possible.

The surfactant may include primary and secondary emulsifiers. Hereinafter, the primary and secondary emulsifiers are collectively referred to as the "emulsifiers" or "surfactants" and individually referred to as the "emulsifier" or "surfactant," unless otherwise specified. The primary emulsifier is a polyaminated fatty acid. The primary emulsifier includes a lower hydrophilic-lyophilic balance (HLB) in comparison to the secondary emulsifier. The primary emulsifier may include, but are not limited to, span 60, span 85, span 65, span 40, and span 20. The primary emulsifier is sorbitan oleate, also referred to as the span 80. The secondary emulsifier may include, but are not limited to triton X-100, Tween™ 80, Tween™ 20, Tween™ 40, Tween™ 60, Tween™ 85, OP4 and OP 7. The secondary emulsifier includes a biosurfactant such as a rhamnolipid surfactant. In an embodiment, the surfactant may be neopelex or stearic acid.

The hematite-based fly ash composition further includes one or more retarders in an amount of 1 to 20%, preferably 3 to 15%, or even more preferably 5 to 10% BWOB. The retarders include one or more lignosulfonates, one or more hydroxycarboxylic acids, one or more saccharides, one or more cellulose derivatives, and one or more organophosphonates. As used herein, retarders, refer to chemical admixtures that slow the hydration of a cement and may be used in large-scale pours where partial hardening may be unavoidable without the presence of a retarder. Suitable examples of retarders include, without limitation, sugar, sucrose, sodium gluconate, glucose, citric acid, tartaric acid, and the like. In an embodiment, the retarder is a lignosulfonate-based retarder—for example, calcium and sodium lignosulfonate.

The hematite-based fly ash composition further includes one or more defoamer(s) in an amount of 0.01 to 0.02% BWOB. As used herein, the term, "defoamer" refers to a foam control agent which is added to a system to reduce or eliminate foam or air bubbles after it has been formed. The defoamer includes one or more of a silicone defoamer, a mineral oil defoamer, an ester defoamer, and an ether defoamer. Certain other examples of the defoamer include, but is not limited to, 2-octanol, oleic acid, paraffinic waxes, amide waxes, sulfonated oils, organic phosphates, and dimethylpolysiloxane. In an embodiment, the defoamer is a dimethyl silicone polymer. In some embodiments, the composition may include an alcohol defoamer, for example, cetostearyl alcohol, lauryl alcohol, cetyl alcohol, stearyl alcohol, oleyl alcohol, decyl alcohol, dodecyl alcohol, and higher fatty alcohols. In a preferred embodiment, the hematite-based fly ash composition has a weight percentage of the defoaming agent ranging from 0.01-1.0% relative to the total weight of the composition, preferably 0.02-0.8%, preferably 0.03-0.6%, preferably 0.04-0.4%, preferably 0.05-0.2%, or about 0.1% BWOB. Other ranges are also possible.

The hematite-based fly ash composition further includes an aqueous alkaline solution, preferably an aqueous alkaline solution, in an amount of 50 to 60% BWOB, preferably about 55% BWOB. Alkali activation generally releases reactive species (e.g., CaO) from the binder, thus increasing the rate of densification and improving the microstructural strength of the binder, which, by extension, affects the mechanical properties and durability performance of the cured composition. The alkali activator may be a mixture of an aqueous solution of a metal hydroxide, preferably an alkali metal hydroxide (e.g., sodium hydroxide, potassium hydroxide, etc.), and a metal silicate, preferably an alkali metal silicate (e.g., sodium silicate, potassium silicate, etc.). In some embodiments, the alkali activator may be an aqueous solution of a metal hydroxide, preferably an alkali metal hydroxide. In an embodiment, the alkali metal hydroxide may be one or more of potassium hydroxide, sodium hydroxide, lithium hydroxide, and calcium hydroxide. In a preferred embodiment, the alkali metal hydroxide is sodium hydroxide. In an embodiment, the alkali hydroxide has a concentration in a range of 1-8 M, preferably 2-7 M, preferably 3-6 M, preferably 4-5 M, preferably 4 M. In an embodiment, the alkali silicate may be sodium silicate or potassium silicate. Sodium silicates with a molar ratio of $SiO_2/Na_2O$ equal to or less than 3.2 are preferred. Potassium silicates with a molar ratio of $SiO_2/K_2O$ equal to or less than 3.2 are preferred. Preferably, the aqueous alkaline solution includes sodium hydroxide and sodium silicate in water. In some more preferred embodiments, a weight ratio of NaOH to the $Na_2SiO_3$ may generally range from 1:1 to 1:4, preferably 1:1.5 to 1:3.5, preferably 1:2 to 1:3, or even more preferably about 1:2.5. Other ranges are also possible.

As used herein, "aggregate" refers to a broad category of particulate material used in construction. Aggregates are a component of composite materials such as concrete; the aggregates serve as reinforcement to add strength to the overall composite material. Aggregates, from different sources, or produced by different methods, may differ considerably in particle shape, size and texture. Shape of the aggregates of the present disclosure may be cubical and reasonably regular, essentially rounded, angular, or irregular. Surface texture may range from relatively smooth with small, exposed pores to irregular with small to large, exposed pores. Particle shape and surface texture of both fine and coarse aggregates may influence proportioning of mixtures in such factors as workability, pumpability, fine-to-coarse aggregate ratio, and water requirement.

The hematite-based fly ash composition may also include one or more fine aggregate (FA). The fine aggregate may include, but is not limited to, sand (e.g., dune sand), crushed stone, crushed rock, crushed shells, or other crushed/pulverized/ground material, for example, crushed/pulverized/ground forms of concrete, gravel, rocks, natural soil, quarried crushed mineral aggregates from igneous (granite, syenite, diorite, gabbro peridotite pegmatite, volcanic glass, felsite, basalt), metamorphic (marble, metaquartzite, slate, phyllite, schist, amphibolite, hornfels, gneiss, serpentite) or sedimentary rocks (conglomerate, sandstone, claystone, siltstone, argillite, shale, limestone, dolomite, marl, chalk, chert), including unused and waste aggregates from quarry operations, dredged aggregates, china clay stent, china clay wastes, natural stone, recycled bituminous pavements, recycled concrete pavements, reclaimed road base and sub-base materials, crushed bricks, construction and demolition wastes, crushed glass, slate waste, waste plastics, egg shells, sea shells, barite, limonite, magnetite, ilmenite, iron, steel, including recycled or scrap steel, and mixtures thereof. In preferred embodiments, the fine aggregate employed in the hematite-based fly ash composition is sand. In an embodiment, the FA is present in an amount of 1 to 10% BWOB, preferably 3 to 5% BWOB. In some embodiments, the FA has a specific gravity of 2.2 to 2.8, and a standard specification of ASTM C128 (Standard Test Method for Relative Density (Specific Gravity) and Absorption of Fine Aggregate, ASTM C128, which is incorporated herein by reference in its entirety).

In a preferred embodiment, the fine aggregate is sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm). In a specific embodiment, the fine aggregate has a specific gravity of preferably 2.2, preferably 2.3, preferably 2.4, and preferably 2.5, preferably 2.64. Other ranges are also possible.

The fine aggregate may have an average particle size of 0.3 to 1 mm, preferably 0.4 to 0.8 mm, preferably 0.5 to 0.6 mm, although fine aggregates with average particle sizes slightly above or below these values may also function as intended. The grading of fine aggregate employed herein preferably conforms to the standard ASTM C 33/C33M-18.

The hematite-based fly ash composition may further include a coarse aggregate (CA) in an amount of 1 to 10 BWOB, preferably 3 to 5% BWOB. In a preferred embodiment, the coarse aggregate present in the hematite-based fly ash composition is crushed limestone. As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluscs. Crushed limestone is generated during the crushing and grinding of limestone rocks. The crushed limestone used herein may have an average particle size greater than 1 mm. In one embodiment, the crushed limestone has an average particle size of 1.5-32 mm, preferably 2-30 mm, preferably 4-28 mm, preferably 6-24 mm, preferably 8-20 mm, preferably 10-18 mm, preferably 12-16 mm. The crushed limestone may contain materials including, but not limited to, calcium carbonate, silicon dioxide, quartz, feldspar, clay minerals, pyrite, siderite, chert and other minerals. In some embodiments, the coarse aggregate has a specific gravity of 2.2 to 2.8, and a maximum particle size of at most 20 mm, preferably at most 18 mm, or even more preferably at most 16 mm. In a specific embodiment, the coarse aggregate has a specific gravity of preferably 2.2, preferably 2.3, preferably 2.4, preferably 2.5, and a maximum particle size of at most 20 mm, preferably at most 18 mm, or even more preferably at most 16 mm. In a most preferred embodiment, the coarse aggregate of the hematite-based fly ash composition is crushed limestone with a specific gravity of 2.1-3.0, preferably 2.2-2.8, more preferably 2.4-2.7, or about 2.56. Other ranges are also possible.

In a preferred embodiment, the hematite-based fly ash composition includes a curable component including class F fly ash and a hematite weighting agent present in an amount of 25 to 75% by weight of the class F fly ash (BWOB); a polynaphthalene sulfonate superplasticizer in an amount of 5 to 10% BWOB; a lignosulfonate-based retarder in an amount of 5 to 10% BWOB; a dimethyl silicone polymer in an amount of 0.01 to 0.02% BWOB; and a sodium hydroxide solution in an amount of 50 to 60% BWOB, wherein sodium hydroxide is present in the sodium hydroxide solution at a concentration of 1 to 8 molar (M).

Figure 6:
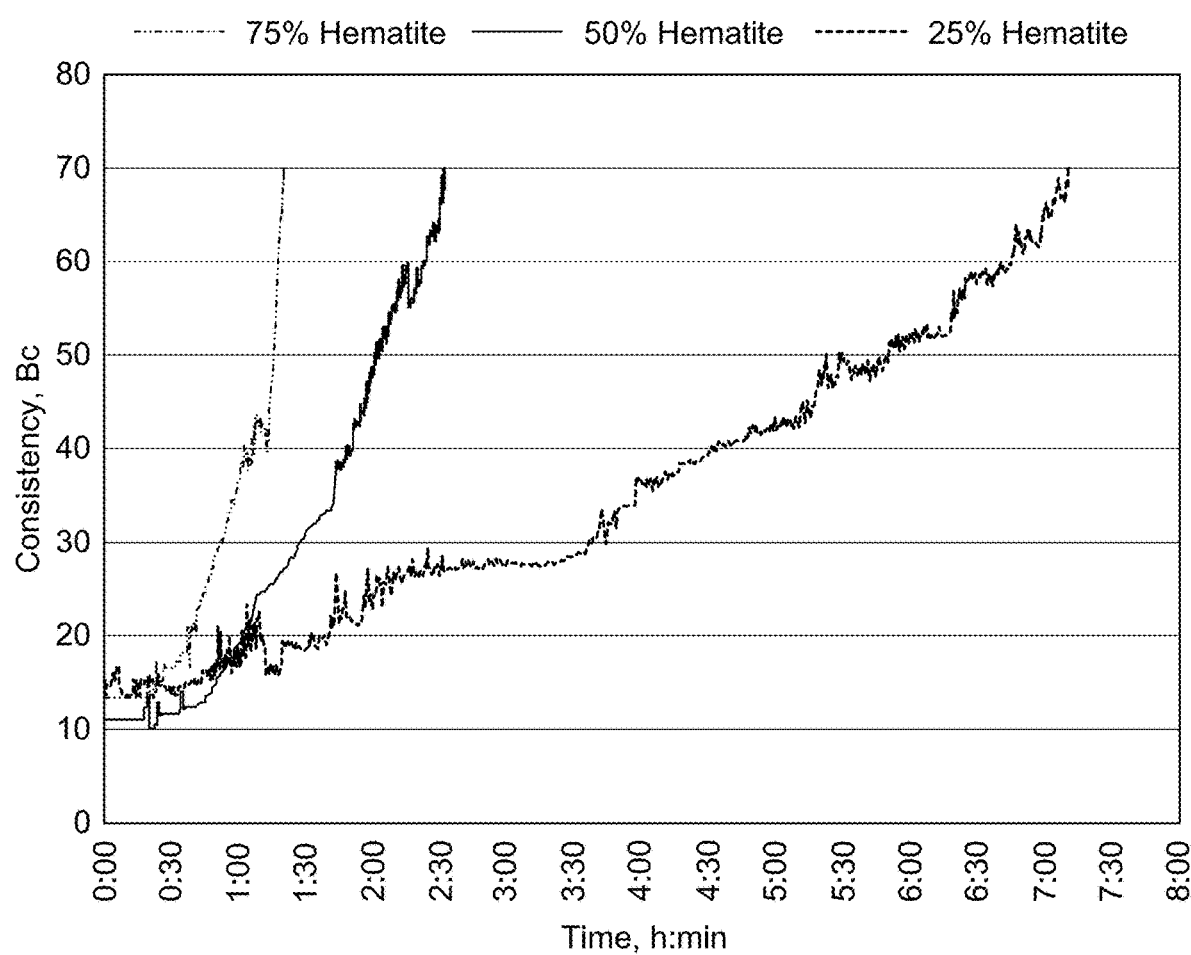
FIG. 6 depicts the effect of hematite on thickening time at 195° F., according to certain embodiments.

In some embodiments, the hematite-based fly ash composition of the present disclosure has a thickening time of from 30 to 900 minutes at 195 degrees Fahrenheit (° F.), preferably 50 to 800 minutes, preferably 80 to 700 minutes, preferably 110 to 600 minutes, or even more preferably 140 to 500 minutes, as depicted in FIG. 6. Other ranges are also possible. The thickening time is measured with a consistometer at 195° F. and atmospheric conditions, according to API Recommended Practice 10B-2 (2013) "Recommended Practice for Testing Well Cements" Section 9, as well as the methods outlined in API Specification 10A, each of which is incorporated herein by reference in their entireties. In some embodiments, the thickening time of the hematite-based fly ash composition in the present disclosure is determined when the hematite-based fly ash composition reaches a Bearden unit of consistency (Bc) value of 70, preferably 80, preferably 90, or even more preferably 100 Bc, at about 195° F. and atmospheric conditions. Other ranges are also possible.

Figure 9:
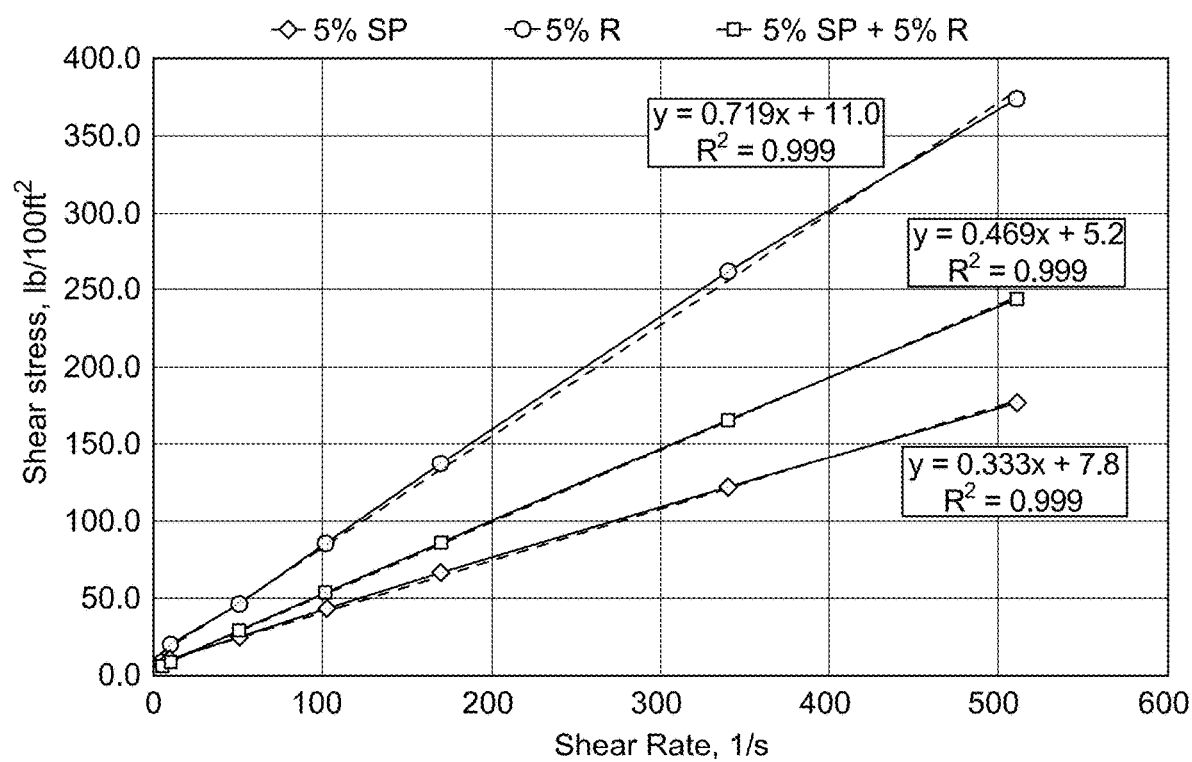
FIG. 9 depicts a shear stress vs. shear rate curve for the superplasticizer and the retarder, alone and in combination, according to certain embodiments.
Figure 11:
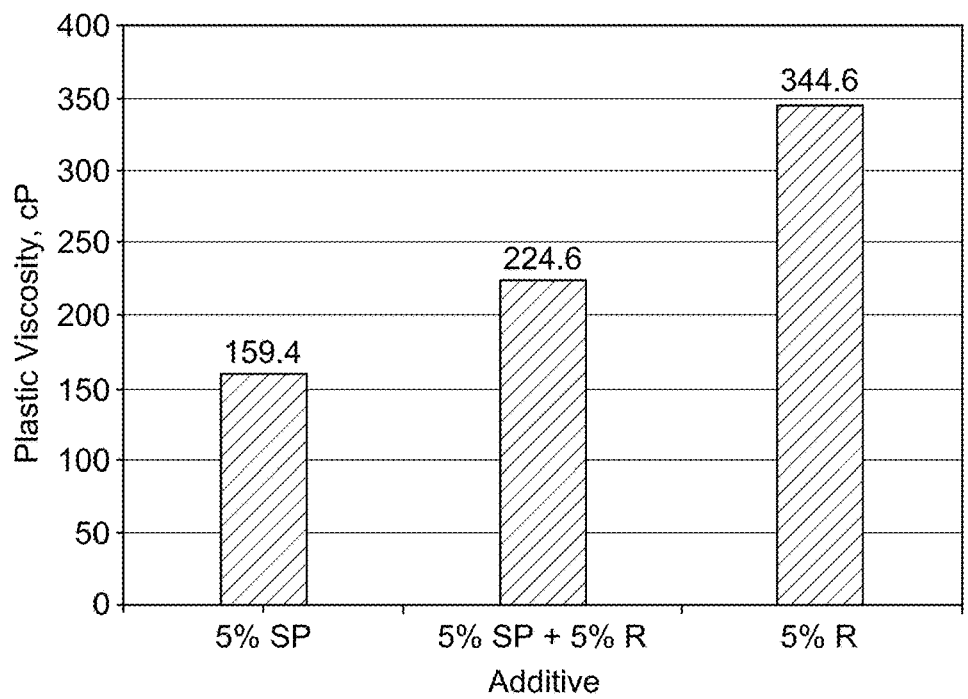
FIG. 11 depicts a plastic viscosity curve for the superplasticizer and the retarder, alone and in combination, according to certain embodiments.

In some further embodiments, the hematite-based fly ash composition of the present disclosure has a plastic viscosity of 100 to 400, preferably 150 to 350, preferably 160-340, preferably 180-300, preferably 190-280, preferably 200-270, preferably 210-260, preferably 220-250 centipoise (cP), as depicted in FIG. 11. Other ranges are also possible. As used herein, the terms "plastic viscosity," "yield point," and "yield stress" are parameters of the Bingham plastic model, which is incorporated herein by reference in its entirety. The plastic viscosity is the slope of the shear stress/shear rate line above the yield point, as depicted in FIG. 9. In the present disclosure, the plastic viscosity obtained from the Bingham plastic model having a high coefficient of determination ($R^2$) of preferably 0.999.

As used herein, the term "apparent viscosity," or "AV" is viscosity of a fluid, e.g., a hematite-based fly ash composition, measured at a given shear rate, e.g., about 1 to 2000 $sec^{-1}$, preferably about 10 to 1000 $sec^{-1}$, preferably 100 to 500 $sec^{-1}$, or even more preferably about 200 to 400 $sec^{-1}$ shear rate, and at a fixed temperature, e.g., about 195° F. Additionally, in the Bingham plastic rheology model, apparent viscosity is usually defined as one-half of the dial reading at, e.g., preferably 600 $sec^{-1}$ shear rate, or even more preferably about 300 $sec^{-1}$ shear rate, measured with a direct-indicating, rotational viscometer.

Figure 12:
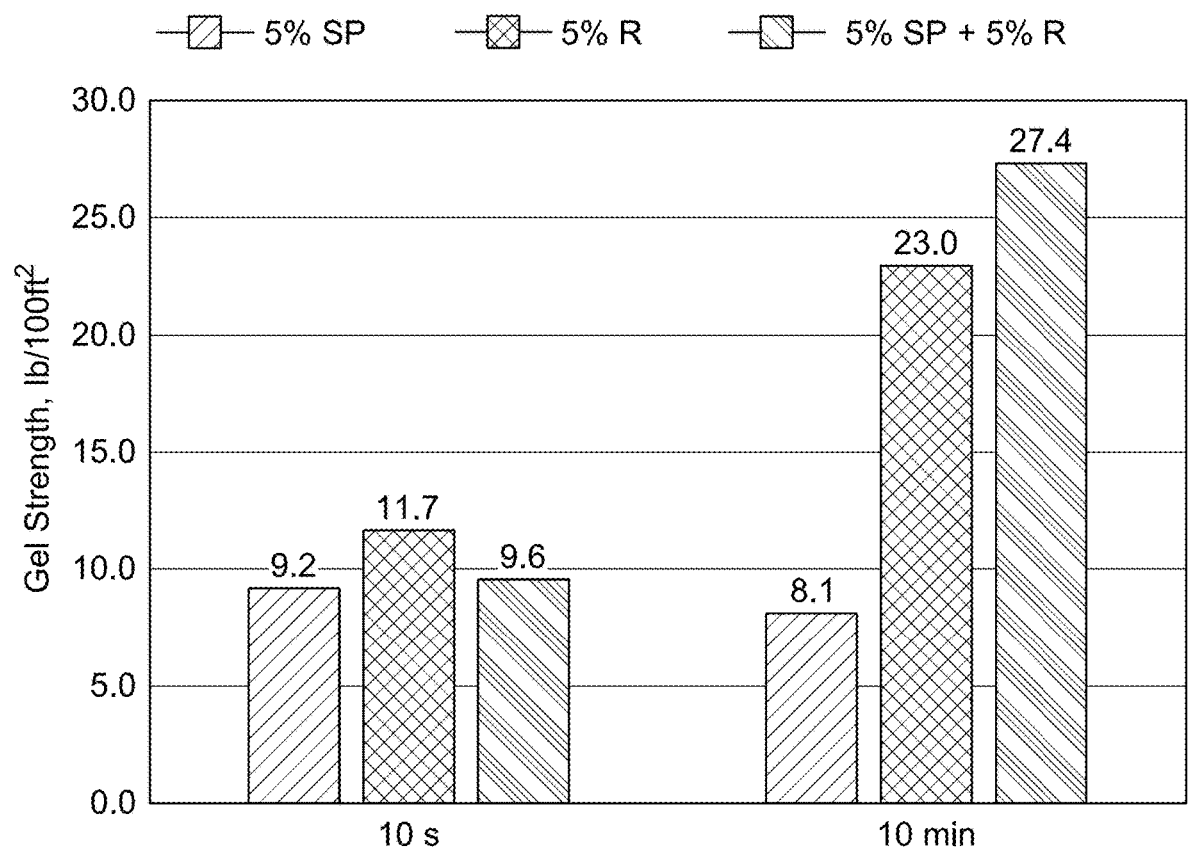
FIG. 12 depicts a gel strength curve for the superplasticizer and the retarder, alone and in combination, according to certain embodiments.

In some preferred embodiments, the hematite-based fly ash composition of the present disclosure has a gel strength of 8 to 12, preferably 8.5 to 11.5, preferably 9 to 11, preferably 9.5 to 10.5, or even more preferably about 10 pounds (lb) per 100 square feet at about 5 seconds(s), as depicted in FIG. 12. Other ranges are also possible. In some most preferred embodiments, the hematite-based fly ash composition of the present disclosure has a gel strength of 8 to 30, preferably 20 to 30, preferably 22 to 28, preferably 23 to 27, or even more preferably about 25 lbs/100 $ft^2$ at about 5 seconds(s), as depicted in FIG. 12. Other ranges are also possible.

FIG. 1A illustrates a flow chart of a method 50 of producing a cured specimen is described. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing and casting the hematite-based fly ash composition in a mold to form a molded composition. In this method, the fly ash binder material and the hematite weighting agent are mixed in defined weight ratios to form a dry mixture of the hematite-based fly ash composition. In a preferred embodiment, the hematite weighting agent, present in an amount of 20 to 80% by weight, preferably 25-75 wt. % of the fly ash binder material (BWOB). To the dry mix is added an aqueous solution of a base, and mixed at a speed of 10000-15000 rotations per minute (rpm), preferably 11000-13000 rpm, preferably 12000 rpm, for a period of 1-5 minutes, preferably 2-4 minutes, preferably 2 minutes, to form a slurry. In an embodiment, the base is may be one or more of potassium hydroxide, sodium hydroxide, lithium hydroxide, and calcium hydroxide. In a preferred embodiment, the base is NaOH. The slurry was further cast into a mold. As used herein, casting refers to the process in which a fluid material is poured into a mold, which contains a hollow cavity of a desired shape, and then allowed to solidify. The solidified part is ejected, demolded or broken out of the mold to complete the process. In one embodiment, the wet slurry may be casted into a mold at a temperature of 10-40° C., preferably 15-35° C., more preferably 23-27° C. thereby forming the molded composition.

Figure 13:
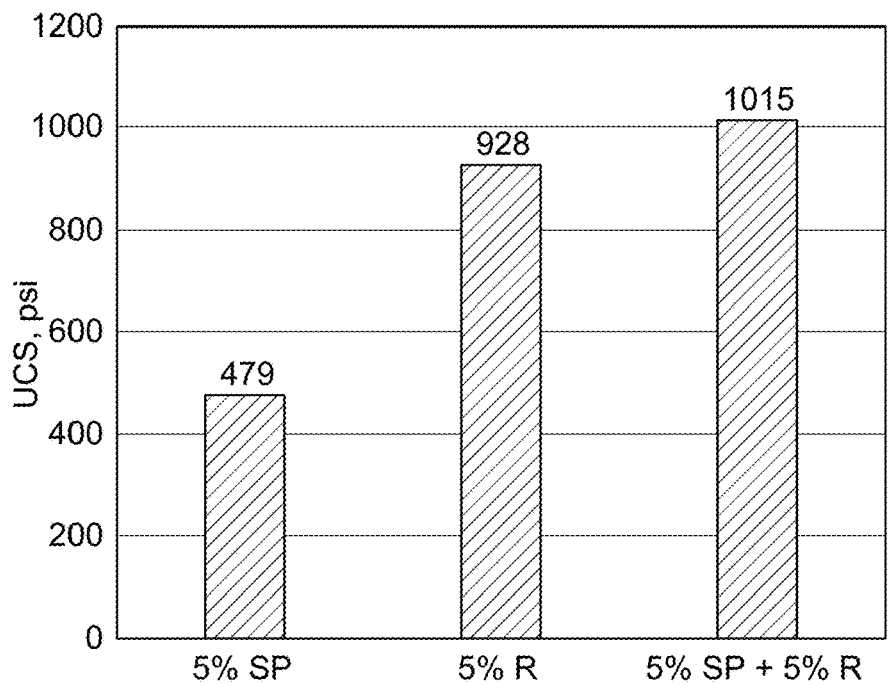
FIG. 13 depicts a 24 h unconfined compressive strength (UCS) curve for the superplasticizer and the retarder, alone and in combination, after curing at 200° F., according to certain embodiments.
Figure 14:
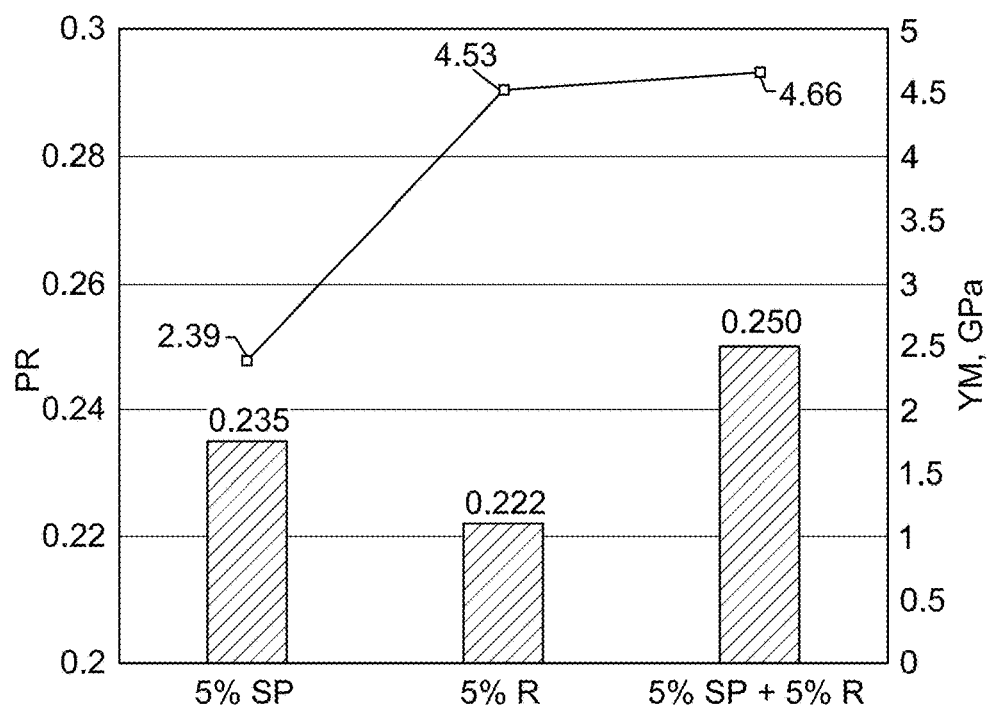
FIG. 14 depicts a Poisson's ratio (PR) and young's modulus (YM) curve for the superplasticizer and the retarder, alone and in combination, after curing at 200° F., according to certain embodiments.

At step 54, the method 50 includes curing the molded composition for 12 to 48 hours thereby forming the cured specimen. As used herein, the term, "curing" refers to a process during which a chemical reaction (such as polymerization) or physical action (such as evaporation) takes place, resulting in a harder, tougher, or more stable linkage (such as an adhesive bond) or substance (such as concrete). Non-limiting examples of curing processes include water curing, wet covering, formwork curing, membrane curing, sheet curing, absorption heat curing, hot mixing, electrical curing, infrared curing, sand/sawdust covering, or natural curing. The curing is conducted at a temperature of 150 to 200° F., preferably 160 to 190° F., and more preferably 195° F. In an embodiment, the curing is performed under the atmospheric conditions at a temperature of 195° F. In some embodiments, the cured specimen has a thickening time of 30 to 650 minutes, preferably 50 to 600 minutes, preferably 70 to 550 minutes, preferably 90 to 500 minutes, or even more preferably 110 to 450 minutes, as determined by a consistometer. Other ranges are also possible. In some further embodiments, the cured specimen consists of the hematite-based fly ash composition, and has a Poisson's ratio (PR) of 0.2 to 0.27, preferably 0.21 to 0.26, preferably 0.22 to 0.25, or even more preferably 0.23 to 0.24, as depicted in FIG. 14. Other ranges are also possible. In some preferred embodiments, the cured specimen consists of the hematite-based fly ash composition, and has a Young's modulus (YM) of 2 to 5 GPa, preferably 2.5 to 4.5, preferably 3 to 4, or even more preferably about 3, as depicted in FIG. 14. Other ranges are also possible. In some most preferred embodiments, the cured specimen consists of the hematite-based fly ash composition, and has a uniaxial compressive strength (UCS) of 400 to 1200 psi, preferably 500 to 1100, preferably 600 to 1000, preferably 700 to 900, or even more preferably about 800 psi, as depicted in FIG. 13 by following the scratch test method. Other ranges are also possible.

Figure 1B:
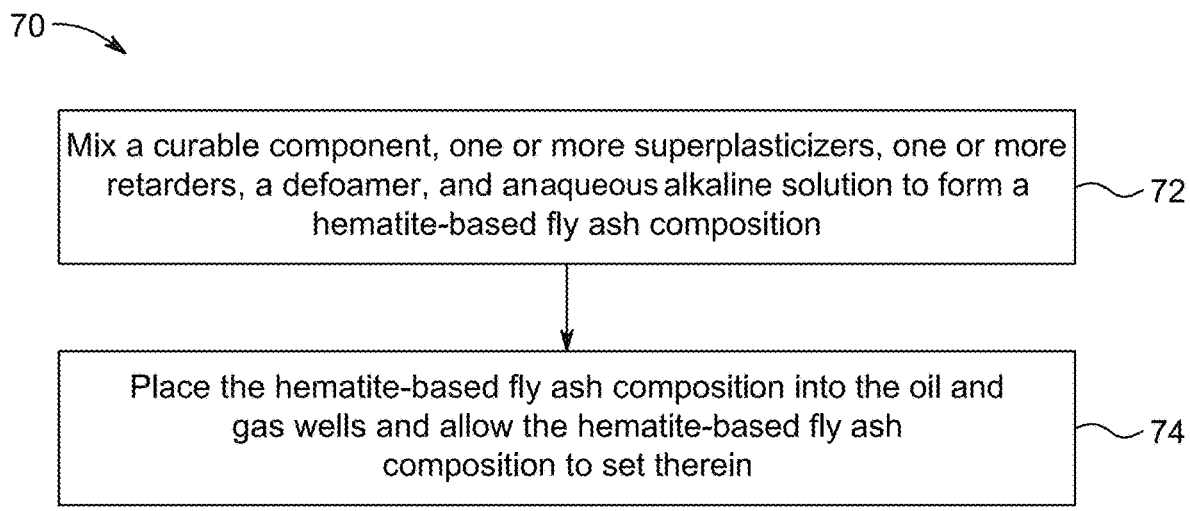
FIG. 1B is a flowchart depicting a method of cementing oil and gas wells, according to certain embodiments.

FIG. 1B illustrates a flow chart of a method 70 of cementing oil and gas wells is described. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 50 includes mixing a curable component, one or more superplasticizers (SPs), one or more retarders, a defoamer, and an aqueous alkaline solution to form a hematite-based fly ash composition. The curable component includes the fly ash binder material (FFA) and a hematite weighting agent present in an amount of 75% by weight of the fly ash binder material (BWOB). The SPs may include one or more sulfonated polymers, one or more carboxylate polymers, and one or more polycarboxylic ethers; and is present in an amount of 5 to 10% BWOB. In a preferred embodiment, the SP is polynaphthalene sulfonate (PNS). The retarders include one or more lignosulfonates, one or more hydroxycarboxylic acids, one or more saccharides, one or more cellulose derivatives, and one or more organophosphonates; and is present in an amount of 5 to 10% BWOB. The defoamer is in an amount of 0.01 to 0.02% BWOB, and includes one or more of a silicone defoamer, a mineral oil defoamer, an ester defoamer, and an ether defoamer. The aqueous alkaline solution is an NaOH solution. The curable component, SP, retarder, and the defoamer are mixed in the aqueous alkaline solution to form the hematite-based fly ash composition.

At step 74, the method 50 includes placing the hematite-based fly ash composition into the oil and gas wells and allowing the hematite-based fly ash composition to set therein. In some embodiments, the hematite-based fly ash composition is placed in at least one of an oil well and a gas well having a temperature of 150 to 200° F., preferably 160 to 190° F., or even more preferably 170 to 180° F. Other ranges are also possible.

The hematite-based fly ash composition containing 75% hematite geopolymer by weight of the binder (BWOB) has a thickening time of 80 to 580 min at downhole temperatures, e.g., preferably at 195° F. The hematite-based FFA geopolymers, when used in combination with the modified lignosulfonate retarder and the PNS superplasticizer, in defined ratios, overcome the challenges associated with thickening time in heavy-weight fly ash geopolymers at elevated temperatures.

EXAMPLES

The following examples demonstrate a hematite-based fly ash composition as described herein. The examples are provided solely for illustration and are not to be construed as limitations of the present disclosure, as many variations thereof are possible without departing from the spirit and scope of the present disclosure.

Example 1: Materials

Figure 2A:
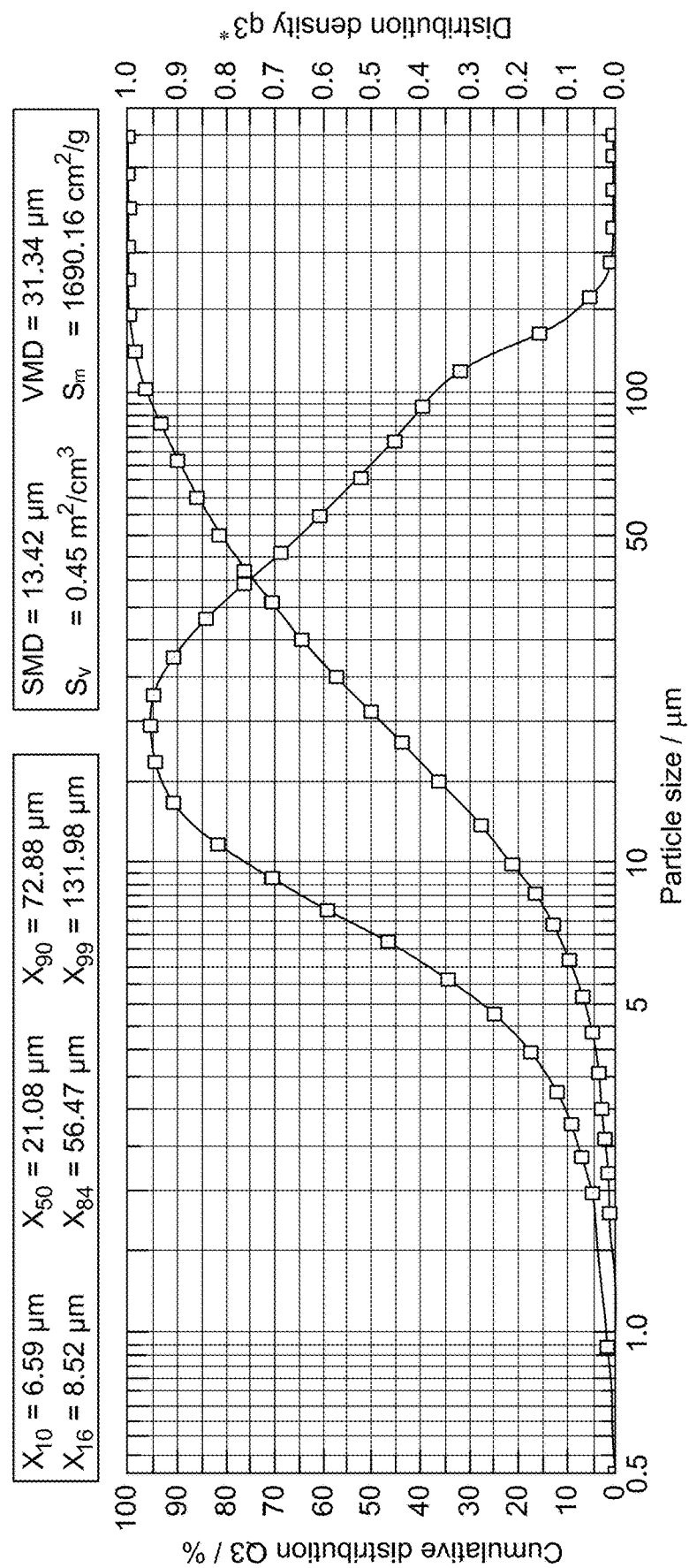
FIG. 2A depicts a particle size distribution (PSD) curve of class F fly ash (FFA), according to certain embodiments.
Figure 2B:
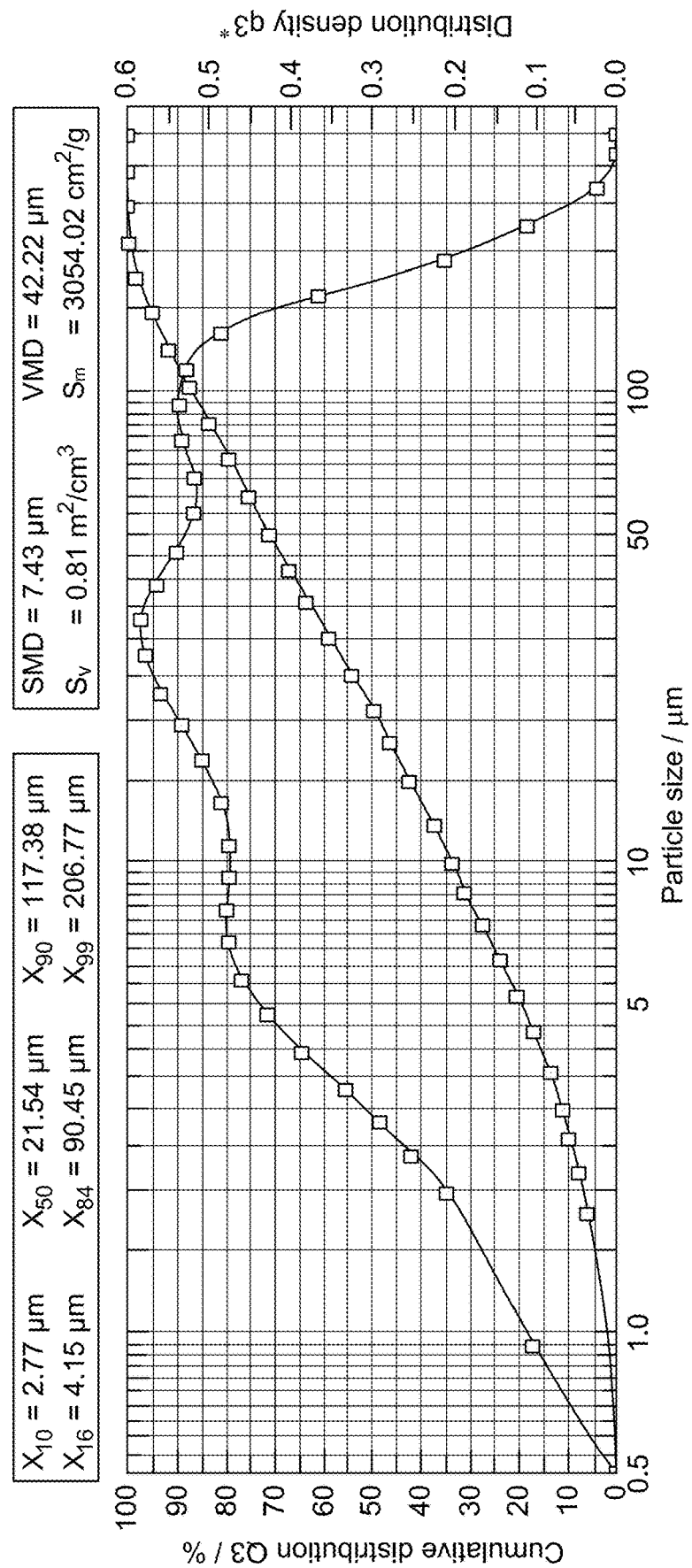
FIG. 2B depicts a PSD curve of hematite, according to certain embodiments.
Figure 3:
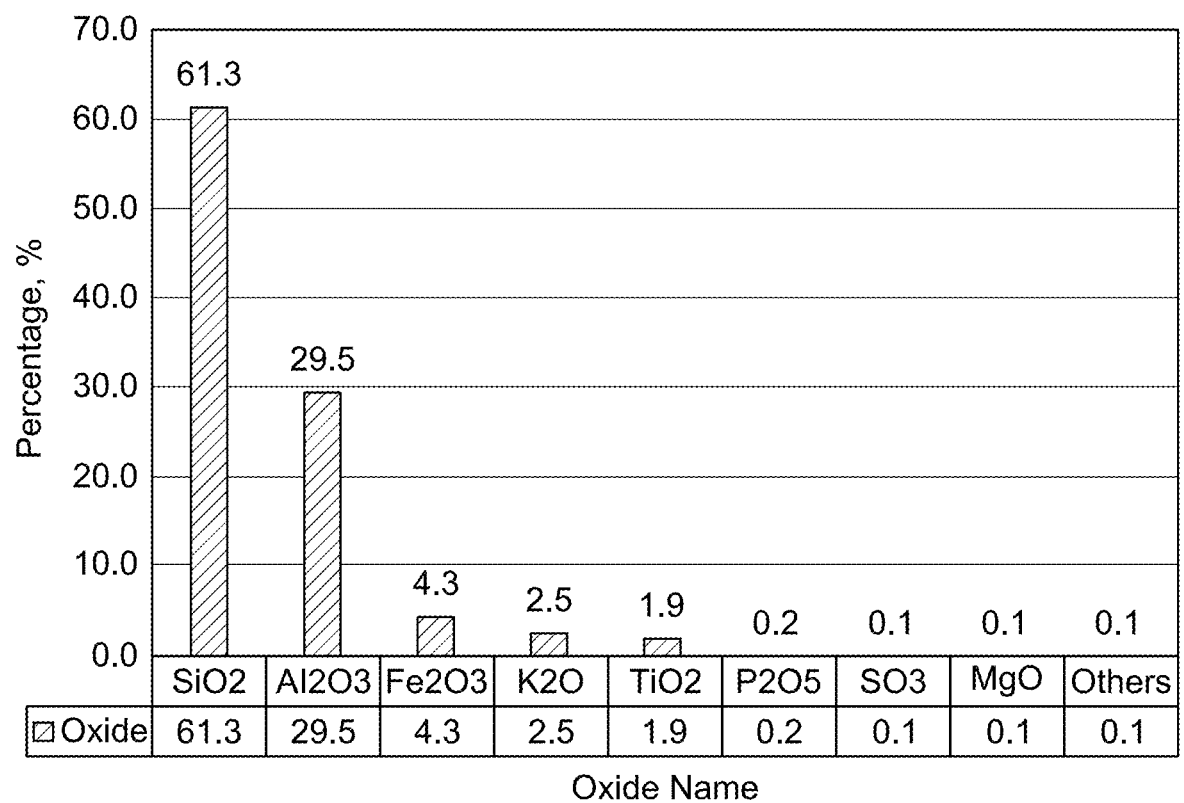
FIG. 3 depicts an X-ray fluorescence (XRF) spectroscopy of the FFA, according to certain embodiments.

The materials used are hematite-based class F fly ash (FFA) as an aluminosilicate source material, hematite as a weighting material, sodium hydroxide as an activator, a poly naphthalene sulfonate (PNS) superplasticizer, a modified lignosulfonate-based retarder, and a defoamer. The specific gravities (SG) of the FFA and hematite were 2.10 and 5.05, respectively. The particle size distributions (PSD) of FFA and hematite were evaluated using a laser diffraction particle size analyzer, as shown in FIG. 2A mad FIG. 2B, respectively. The PSD results showed that $X_{50}$ was about 21.08 and about 21.54 μm for FFA and hematite particles, respectively. FIG. 3 presents the oxide composition of FFA obtained by the Bruker M4 Tornado X-ray fluorescence (XRF). XRF confirms that FFA has substantial quantities of silica ($SiO_2$) and alumina ($Al_2O_3$), as shown in FIG. 3, which play a key role in the geo-polymerization reaction. As depicted in FIG. 4, SEM demonstrates that FFA particles are spherical (FIG. 4A) while hematite particles have irregular shapes (FIG. 4B).

Example 2: Slurry Preparation and Mix Design

NaOH solution was prepared by dissolving NaOH pellets in distilled water using a magnetic stirrer and then left to cool down for at least 24 hours before experiments. FFA was sieved to ensure the particles' size was lower than 100 μm. Two different processes (wet and dry) can be used to prepare geopolymer slurries [Salehi, S., Khattak, M. J., Rizvi, H., Karbalaei, S. F., Kiran, R., 2017. Sensitivity analysis of fly ash geopolymer cement slurries: Implications for oil and gas wells cementing applications. J Nat Gas Sci Eng 37, 116-125, which is incorporated herein by reference in its entirety]. In the wet process, a superplasticizer and/or retarder are mixed with activation solution for 2 minutes at a high shear rate (preferably about 12,000 RPM) using a constant speed mixer. A binder such as FFA was added and mixed with a premixed solution at a high shear rate for another 2 minutes. The wet process approach was followed to prepare the geopolymer slurries in this study. Different types of retarders, superplasticizers, and combinations of both were tested until selecting the proposed mixture that gave the highest thickening time. The methodology underwent a mixability check, rheology evaluation, and thickening time.

All the geopolymer formulations contain FFA (preferably about 100% BWOB), 4 M NaOH solution (preferably about 56% BWOB), and a defoamer (preferably about 0.0164% BWOB). Firstly, hematite was added in three percentages (25, 50, and 75% BWOB) to examine its effect on the thickening time. Then, the lignosulfonate-based retarder was added to the 75% hematite formulation in two concentrations (preferably about 5% and 10% BWOB). The retarder effects on rheology and thickening time were assessed. After that, the PNS superplasticizer effects on thickening time and rheology were evaluated using two concentrations (preferably about 5% and 10% BWOB). Finally, a mixture of a retarder and a superplasticizer (5% BWOB each) was examined.

Example 3: Rheology and Thickening Time

The viscometer was used to evaluate rheology at atmospheric conditions. The readings were measured in ascending and descending orders, and the average values were reported. Then, the observed data were checked to know which model provides the best fit for the data. The thickening time test was conducted at 195° F. to examine how long the developed geopolymer would remain pumpable. The rheology and thickening time measurements were run at least three times using different devices to ensure the reliability and reproducibility of the results.

Example 4: Mechanical Measurement

Figure 5:
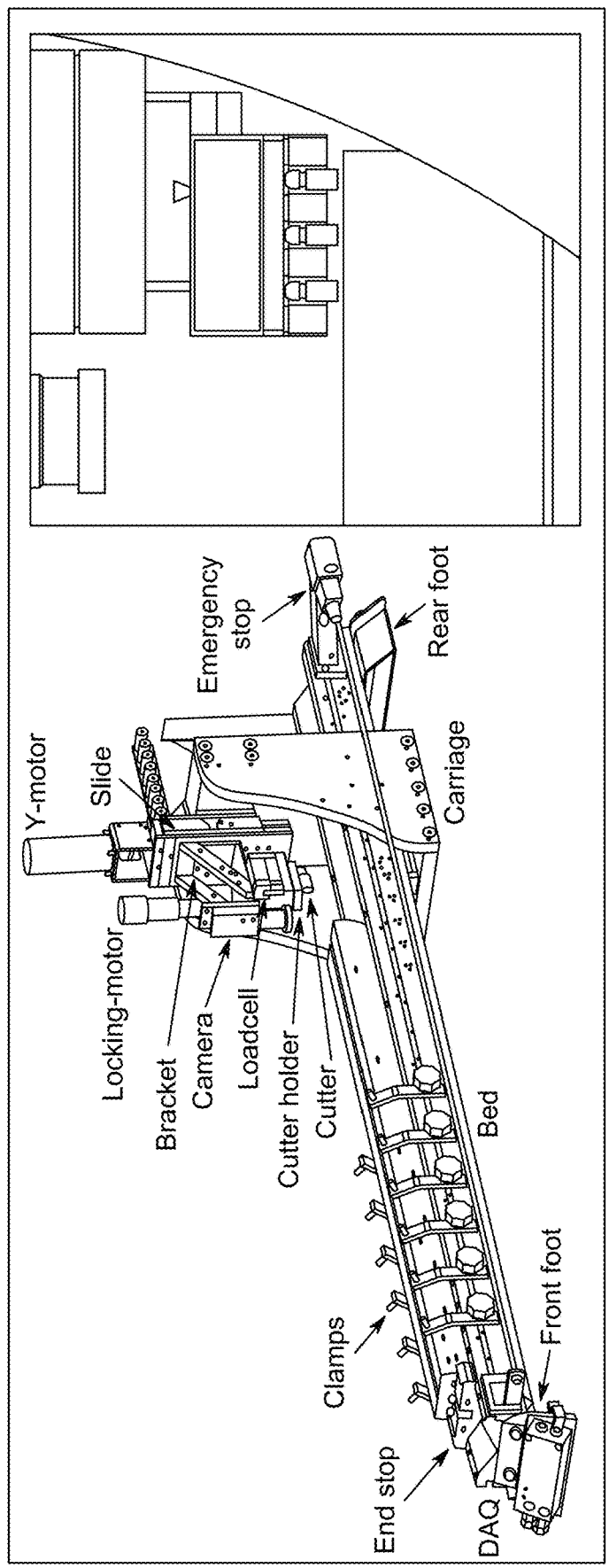
FIG. 5 is a schematic illustration depicting a scratch test device and the sonic mode probes, according to certain embodiments.

After mixing, an atmospheric consistometer was used for conditioning the geopolymer slurries at 170° F. and 150 RPM for 30 min. The slurries were poured into cylindrical molds and placed in a water bath at 200° F. for 24 h. A scratch test with a sonic mode device was used to measure the unconfined compressive strength (UCS) and the dynamic elastic properties, such as Poisson's ratio (PR) and Young's modulus (YM). The elastic properties were estimated using sonic waves (compressional and shear). The scratch or cutting test entails using a cutter to scratch a number of sequential grooves on the surface of a sample. The idea of the scratch test is to regulate and keep track of the continuous shearing action caused by the motion of a diamond cutter on the surface of core samples. The force acting on the cutter is used to calculate the continuous profile of rock strength (UCS) along the sample. The ultrasonic test calculates how long it takes a pressure wave to travel between two ultrasonic probes. The pressure wave velocities can be calculated from the travel times. The scratch test device with sonic mode is shown in FIG. 5.

Example 5: Thickening Time

It can be seen that increasing the hematite percentage significantly reduced the thickening time at 195° F., as shown in FIG. 6. The thickening time decreased from 430 to 80 min with increasing hematite from 25 to 75% BWOB. Moreover, the thickening time curve became more like the right angle set by increasing the hematite percentage. The reduction in the thickening time can be attributed to Si—O—Al or Si—O—K bonds that form faster in the consolidated material when kaolin is calcined, and iron oxide is present in the metakaolin-based geopolymers.

Example 6: Superplasticizer and Retarder Effects

Figure 7:
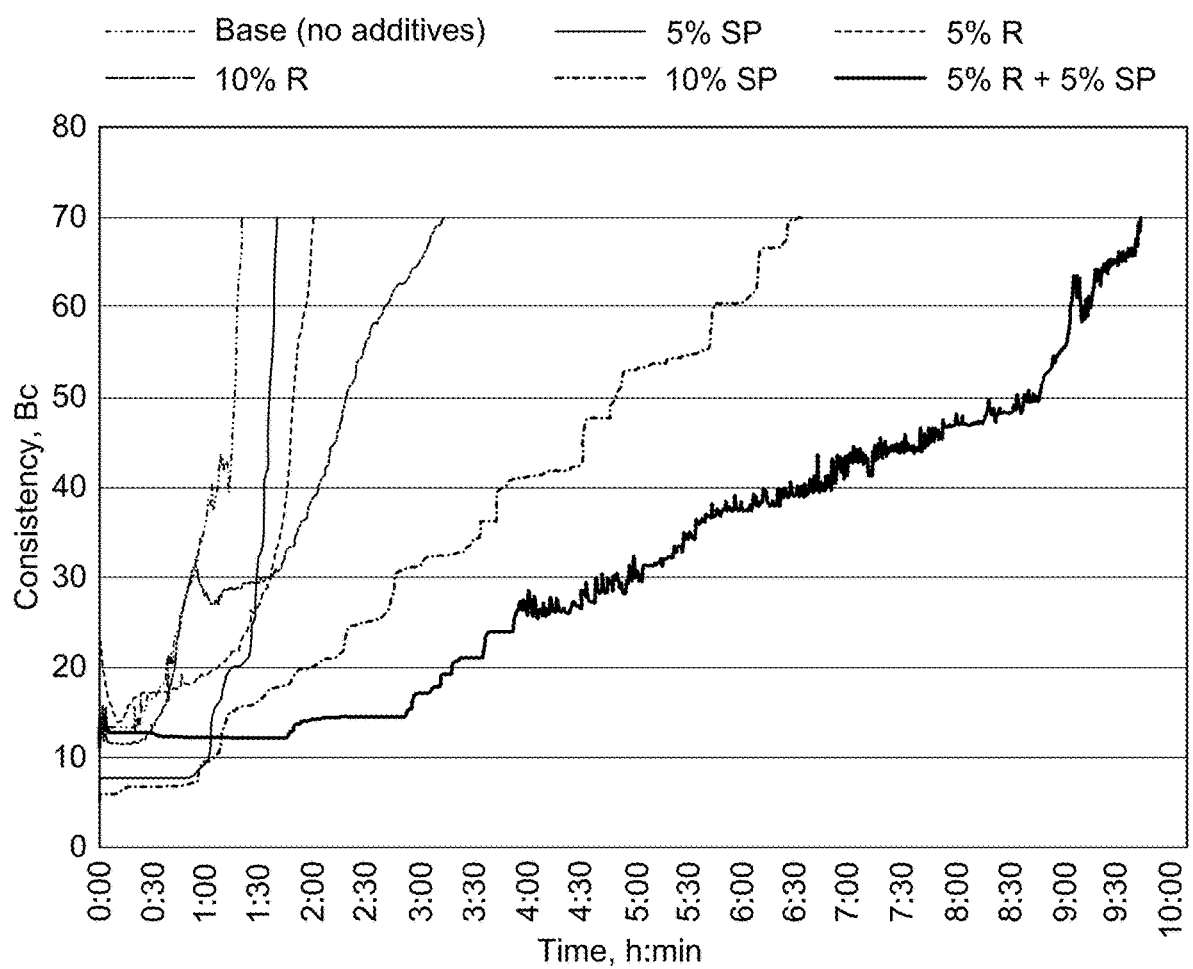
FIG. 7 depicts the effect of the additives (superplasticizer and retarder, alone and in combination), at various concentrations, on thickening time at 195° F., according to certain embodiments.
Figure 8A:
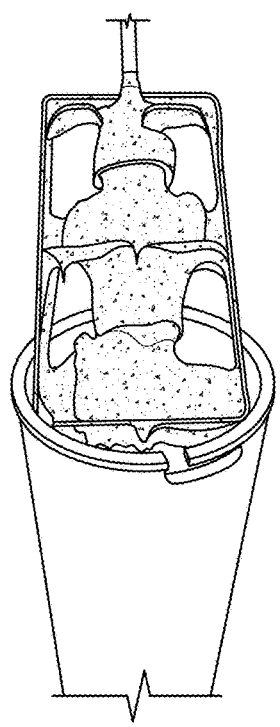
FIG. 8A depicts a geopolymer slurry at the end of thickening time test, according to certain embodiments.
Figure 8B:
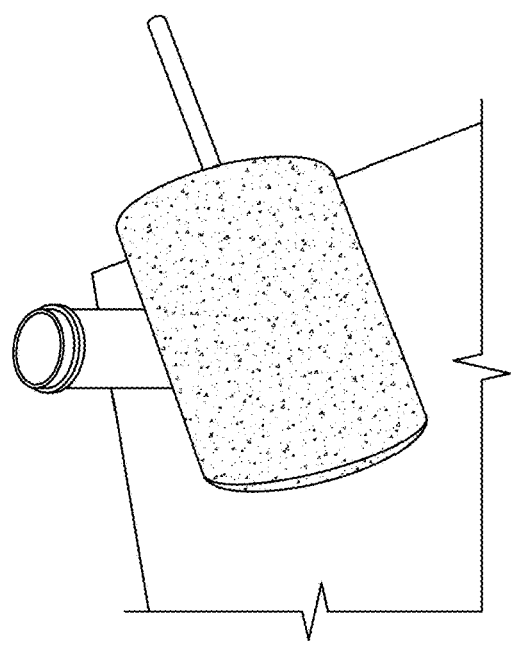
FIG. 8B depicts a geopolymer slurry published by Salehi et al. (Salehi, S., Khattak, M. J., Ali, N., Ezeakacha, C., Saleh, F. K., 2018. Study and Use of Geopolymer Mixtures for Oil and Gas Well Cementing Applications. J Energy Resour Technol 140)

Increasing the thickening time of the high-density hematite-based FFA geopolymers is essential for well-cementing. The effect of each additive on thickening time was individually investigated in 2 concentrations (preferably about 5% and 10% BWOB). The modified lignosulfonate-based retarder increased the thickening time from 80 to 119 and 192 min for 5% and 10% retarder concentrations, respectively, as shown in FIG. 7. The PNS superplasticizer increased the thickening time from 80 to 99 and 393 min for 5% and 10% superplasticizer concentration, respectively as presented in FIG. 7. It was found that a mixture of a PNS superplasticizer (preferably about 5% BWOB) and modified lignosulfonate-based retarder (preferably about 5% BWOB) increased the thickening time from 80 to 580 min at 195° F. Adding PNS superplasticizer alone decreased the viscosity in the beginning, and this can be confirmed by the low initial consistency as compared to other additives, as shown in FIG. 7. It is important to visually check the cement slurry and the consistometer pedal after the thickening time test as gelling around the pedal may result in misleading values. FIG. 8A shows the slurry at the end of the test and confirms that the slurry can still be pumped after the test. FIG. 8B shows the geopolymer slurry published by Salehi et al. (Salehi, S., Khattak, M. J., Ali, N., Ezeakacha, C., Saleh, F. K., 2018. Study and Use of Geopolymer Mixtures for Oil and Gas Well Cementing Applications. J Energy Resour Technol 140).

Example 7: Rheological Properties

Figure 10:
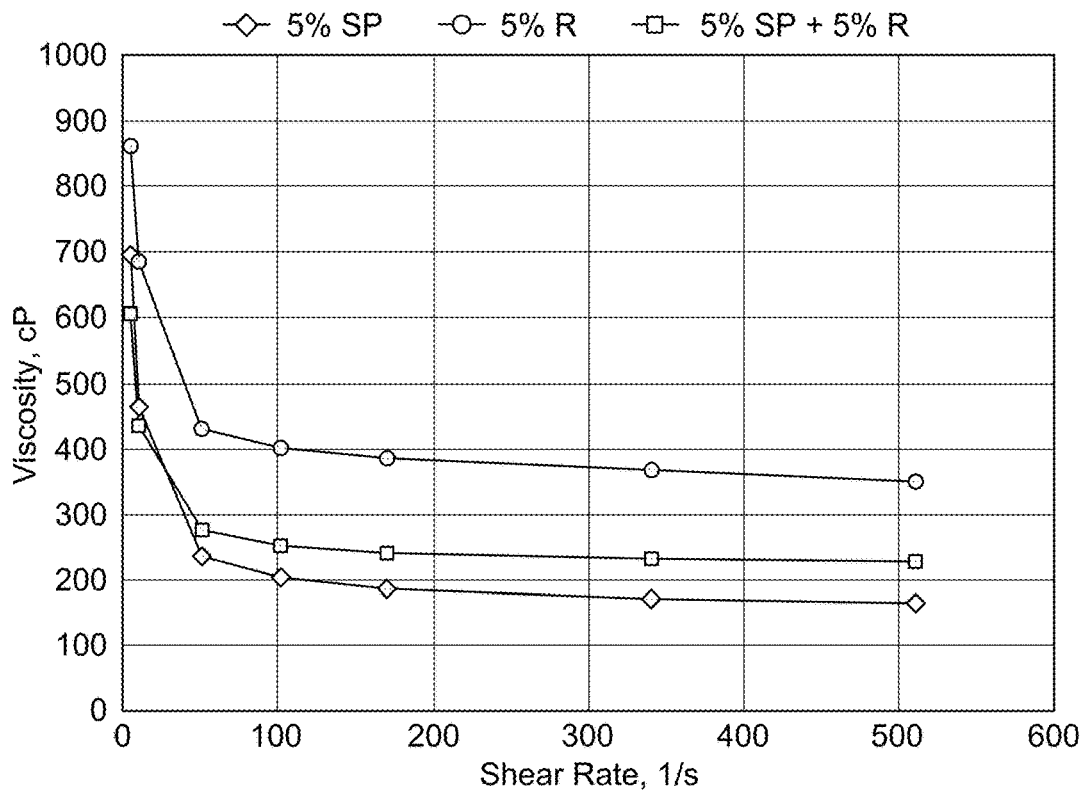
FIG. 10 depicts an apparent viscosity vs. shear rate curve for the superplasticizer and the retarder, alone and in combination, according to certain embodiments.

Rheological properties evaluation is required as it affects pumping requirements, mixing, and drilling fluids removal efficiency. The effect of the developed mixture of the PNS superplasticizer and the modified LS retarder on rheology was evaluated and compared to the performance of each additive (5% BWOB) when used on its own. The shear stress versus shear rate results of the three formulations are presented in FIG. 9. The Bingham plastic model offered the best fit for the measured data, as indicated by a high coefficient of determination ($R^2$) of 0.999, as shown in FIG. 9. All formulations had shear thinning behavior because viscosity decreases as the shear rate increases, as shown in FIG. 10. The developed mixture produced a formulation with a plastic viscosity of 224.6 cP, which is shown in FIG. 11, falls between 159.4 cP and 344.6 cP for the superplasticizer and the retarder, respectively. Adding the PNS superplasticizer alone adversely affected the gel strength as the 10 min (8.1 lbf/100 ft$^2$) value was lower than the 10 sec one (9.2 lbf/100 ft$^2$) unlike other formulations. The 10 sec gel strength values for the 3 formulations were close. The developed mixture introduced a formulation with the highest 10-minute gel strength value, as shown in FIG. 12. The yield point of the developed mixture formulation was 5.2 lbf/100 ft$^2$, which can be considered acceptable. Horizontal sections cementing is generally more challenging than vertical sections, and the yield point for cement slurries used in horizontal sections should not be lower than 5 lbs/100 ft².

Example 8: Mechanical Properties

The effects of the developed mixture containing 5% BWOB of the PNS superplasticizer and 5% BWOB of the modified LS retarder on the geopolymer mechanical properties were investigated and compared to the individual effects of each additive (5% BWOB). The described mixture formulation possessed the highest 24 h UCS (1,015 psi) as compared to the retarder formulation (928 psi) and the superplasticizer formulation (479 psi), as shown in FIG. 13. Moreover, the developed mixture-based sample had a Poisson's ratio of 0.25 and a young's modulus of 4.66 GPa.

FIG. 14 shows the results of the dynamic elastic properties (PR and YM) for different additives. All the samples had a PR that is higher than class G cement and a YM that is lower than class G cement as reported by Liu (Liu, G., 2021. Applied Well Cementing Engineering, Applied Well Cementing Engineering. Elsevier). These dynamic properties showed that the developed high-density FA geopolymer systems are more flexible than class G cement in terms of higher PR and lower YM.

To conclude, the present disclosure addresses the problem of low thickening times and pumpability issues encountered while using high-density hematite-based FFA geopolymers. The high-density hematite-based FFA geopolymer described herein presents a solution to address thickening time challenges at high temperatures in the presence of a modified lignosulfonate retarder and a PNS superplasticizer. The thickening time, rheological, and mechanical properties of the hematite-based FFA geopolymer were examined. The results show that the thickening time of the hematite-based FFA geopolymer decreased by 81.4% with increasing hematite from 25 to 75% BWOB. The hematite-based FFA geopolymers increased the thickening time from 80 to 580 min at 195° F. for the 75% hematite geopolymer. Additionally, the hematite-based FFA geopolymers decreased the plastic viscosity of the high-density geopolymer slurry by 29%, which facilitates mixing and pumping.

Numerous modifications and variations of the present disclosure are possible in light of the above teachings. It is therefore to be understood that within the scope of the appended claims, the invention may be practiced otherwise than as specifically described herein.

The invention claimed is:

1. A hematite-based fly ash composition, comprising:
a curable component comprising a fly ash binder material (FFA) and a hematite weighting agent present in an amount of 20 to 80% by weight of the fly ash binder material (BWOB);
one or more superplasticizers (SPs) in an amount of 5 to 10% BWOB;
one or more retarders in an amount of 5 to 10% BWOB;
a defoamer in an amount of 0.01 to 0.02% BWOB; and
an aqueous alkaline solution in an amount of 50 to 60% BWOB;
wherein the hematite-based fly ash composition has a thickening time of from 80 to 580 minutes at 195 degree Fahrenheit (° F.), and a plastic viscosity of 150 to 350 centipoise (cP);
wherein the FFA comprises 59 to 63 wt. % $SiO_2$, 27 to 31 wt. % $Al_2O_3$, 2.5 to 6.5 wt. % $Fe_2O_3$, 1 to 4 wt. % $K_2O$, 1 to 3 wt. % $TiO_2$, 0.05 to 0.5 wt. % $P_2O_5$, 0.05 to 0.5 wt. % $SO_3$, 0.05 to 0.5 wt. % MgO, each wt. % based on a total weight of the FFA, as determined by X-ray fluorescence (XRF) analysis.

2. The composition of claim 1, wherein the thickening time of the curable component comprising 75% BWOB of the hematite weighting agent is at least 81.4% lower than the thickening time of the curable component comprising 25% BWOB of the hematite weighting agent.

3. The composition of claim 1, wherein the FFA is in the form of spherical fly ash particles having an average particle size $D_{50}$ of about 20 to 25 μm.

4. The composition of claim 1, wherein the FFA is at least one selected from the group consisting of class C fly ash and class F fly ash.

5. The composition of claim 1, wherein the hematite weighting agent is in the form of irregular shaped hematite particles having an average particle size $D_{50}$ of about 20 to 25 μm.

6. The composition of claim 1, wherein the FFA has a specific gravity of 2 to 2.2, and wherein the hematite weighting agent has a specific gravity of 5 to 5.1.

7. The composition of claim 1, wherein the one or more superplasticizers comprise one or more sulfonated polymers, one or more carboxylate polymers, and one or more polycarboxylic ethers.

8. The composition of claim 1, wherein the one or more retarders comprise one or more lignosulfonates, one or more hydroxycarboxylic acids, one or more saccharides, one or more cellulose derivatives, and one or more organophosphonates.

9. The composition of claim 1, wherein the defoamer comprises at least one of a silicone defoamer, a mineral oil defoamer, an ester defoamer and an ether defoamer.

10. The composition of claim 1, wherein the aqueous alkaline solution comprises an alkali metal hydroxide and an alkali silicate.

11. The composition of claim 10, wherein the aqueous alkaline solution comprises an alkali metal hydroxide selected from the group consisting of potassium hydroxide, sodium hydroxide, lithium hydroxide, and calcium hydroxide.

12. The composition of claim 1, wherein the curable component comprises class F fly ash and wherein the hematite weighting agent is present in an amount of 25 to 75% BWOB;
wherein the superplasticizer is a polynaphthalene sulfonate and is present in an amount of 5 to 10% BWOB;
wherein the retarder is a lignosulfonate-based and is present in an amount of 5 to 10% BWOB;
wherein the defoamer is a dimethyl silicone polymer and is present in an amount of 0.01 to 0.02% BWOB; and
wherein the aqueous alkaline solution is a sodium hydroxide solution and is present in an amount of 50 to 60% BWOB, wherein sodium hydroxide is present in the sodium hydroxide solution at a concentration of 1 to 8 molar (M).

* * * * *